US012787980B2

(12) United States Patent
Wilson et al.

(10) Patent No.: US 12,787,980 B2
(45) Date of Patent: Nov. 10, 2026

(54) MULTILEVEL PET PUZZLE

(71) Applicant: The Kyjen Company, LLC, Centennial, CO (US)

(72) Inventors: Graham Wilson, Denver, CO (US); Nina Ottosson, Karlskoga (SE); Meghan Higgins, Denver, CO (US); Danielle Salyer, Denver, CO (US); Chaz Ozzello, Englewood, CA (US)

(73) Assignee: The Kyjen Company, LLC, Centennial, CO (US)

( * ) Notice: Subject to any disclaimer, the term of this patent is extended or adjusted under 35 U.S.C. 154(b) by 0 days.

(21) Appl. No.: 18/654,509

(22) Filed: May 3, 2024

(65) Prior Publication Data

US 2024/0365751 A1 Nov. 7, 2024

Related U.S. Application Data

(60) Provisional application No. 63/464,392, filed on May 5, 2023.

(51) Int. Cl.
*A01K 15/02* (2006.01)

(52) U.S. Cl.
CPC .................................. *A01K 15/025* (2013.01)

(58) Field of Classification Search
CPC .................................................... A01K 15/025
See application file for complete search history.

(56) References Cited

U.S. PATENT DOCUMENTS

| | | | | |
|---|---|---|---|---|
| 8,316,804 B2 | 11/2012 | Ottosson | | |
| 9,756,835 B1 * | 9/2017 | Ottosson | .............. | A01K 5/0135 |
| 2014/0202396 A1 | 7/2014 | Hansen | | |
| 2014/0305381 A1 * | 10/2014 | Hansen | ................ | A01K 15/025 119/711 |
| 2020/0187456 A1 * | 6/2020 | Citak | .................... | A63F 9/0601 |
| 2020/0337268 A1 * | 10/2020 | Citak | ................... | A01K 15/025 |
| 2022/0225594 A1 | 7/2022 | Steinkraus | | |
| 2023/0200351 A1 * | 6/2023 | Mahtani | ............... | A01K 15/025 119/62 |

FOREIGN PATENT DOCUMENTS

| | | | | |
|---|---|---|---|---|
| CN | 215992348 U | 3/2022 | | |
| GB | 2488379 A * | 8/2012 | ........... | A01K 15/027 |

OTHER PUBLICATIONS

Citak (AT_516156_B1) (Year: 2016).*
CN_215992348_U (Year: 2022).*
International Search Report and Written Opinion for PCT/US2024/27665, mailed Aug. 28, 2024. (8 pages).

* cited by examiner

*Primary Examiner* — Joshua D Huson
*Assistant Examiner* — Edgar Reyes
(74) *Attorney, Agent, or Firm* — Lempia Summerfield Katz LLC

(57) ABSTRACT

A multilevel pet puzzle includes a first level including a first puzzle of a first puzzle type, a portion of the first puzzle movable to provide access to a first treat compartment, and a second level including a second puzzle of a second puzzle type, a portion of the second puzzle movable to provide access to a second treat compartment.

12 Claims, 21 Drawing Sheets

MULTILEVEL PET PUZZLE

This application claims the benefit of priority to U.S. Provisional Application entitled "MULTILEVEL PET PUZZLE," filed May 5, 2023, and assigned Ser. No. 63/464,392, the entire disclosure of which is hereby expressly incorporated by reference.

FIELD OF THE DISCLOSURE

The disclosure relates generally to pet toys, and more specifically, to an interactive pet puzzle configured to mentally stimulate pets.

BRIEF DESCRIPTION OF RELATED TECHNOLOGY

Generally, a wide variety of pet toys are available to keep pets entertained. For example, pet toys include chew toys which are typically comprised of durable materials such as rubber or nylon and are designed to withstand heavy chewing. Other pet toys include squeaky toys, designed to make noise entertaining pets; balls and frisbees, designed to entertain pets while encouraging exercise; plush toys; and the like. However, in addition to keeping pets entertained, it is important to provide pets with mental stimulus in order to improve their overall health and behavior. Accordingly, there is a need for interactive pet toys that mentally stimulate pets by requiring them to solve a puzzle. Additionally, there is a need for interactive pet toys that reward a pet for successfully completing a puzzle, thereby encouraging the pet to engage with the toy again in the future.

SUMMARY OF THE DISCLOSURE

In accordance with one aspect of the present disclosure, a multilevel pet puzzle includes a first level having a first puzzle type, a portion of the first puzzle type movable to provide access to a first treat compartment, and a second level puzzle having a second puzzle type, a portion of the second puzzle type movable to provide access to a second treat compartment.

In some examples, the multilevel puzzle may further include a third level including a third puzzle type. A portion of the third puzzle type may be movable to provide access to a third treat compartment.

The portion of the third puzzle may be movable from a starting position to a solved position. When the portion of the second puzzle type is in the starting position, the portion of the second puzzle type prevents the portion of the third puzzle type from being moved to the solved position.

The portion of the first puzzle type may be rotatable from the starting position to the solved position. The portion of the second puzzle type may be slidable from the starting position to the solved position.

In some examples, the multilevel puzzle may further include a fourth level including a fourth puzzle type. A portion of the fourth puzzle type may be movable to provide access to a fourth treat compartment.

The portion of the first puzzle type may be movable in a first direction from a starting position to a solved position. The portion of the second puzzle type may be movable in a second direction, different than the first direction, from a starting position to a solved position.

In some examples, the first direction and the second direction may be perpendicular.

The first level may include a plurality of first puzzle types. The second level may include a plurality of second puzzle types.

The portion of the first puzzle type may be a treat wheel. The portion of the second puzzle type may be a sliding door.

The first level may be disposed above the second level.

In accordance with another aspect of the present disclosure, a multilevel pet puzzle includes a housing, a first level including a first level treat compartment and a treat wheel, and a second level including a second level treat compartment and a sliding door. The treat wheel may be rotatably coupled to the housing and rotatable between a starting position in which the first level treat compartment is concealed and a solved position in which the first level treat compartment is accessible. The sliding door may be slidably coupled to the housing such that the sliding door is slidable between a starting position in which the second level treat compartment is concealed and a solved position in which the second level treat compartment is accessible.

In some examples, when the treat wheel is in the starting position, the treat wheel may prevent the sliding door from being moved to a solved position.

The treat wheel may be rotatable in a first direction from the starting position to the solved position. The sliding door may be slidable in a second direction from the starting position to the solved position. The first direction and the second direction may be perpendicular.

The first level may include a plurality of first level treat compartments and a plurality of treat wheels rotatably coupled to the housing. Each of the plurality of treat wheels may be rotatable between a starting position in which a corresponding first level treat compartment is concealed and a solved position in which the corresponding first level treat compartment is accessible. The second level may include a plurality of second level treat compartments and a plurality of sliding doors slidably coupled to the housing. Each of the plurality of sliding doors may be slidable between a starting position in which a corresponding second level treat compartment is concealed and a solved position in which the corresponding second level treat compartment is accessible.

The first level may be disposed above the second level.

In accordance with yet another aspect of the present disclosure, a multilevel pet puzzle includes a housing, an upper level including an upper level treat compartment and a sliding door slidably coupled to the housing, and a lower level including a drawer having a drawer treat compartment. The sliding door may be slidable between a starting position in which the first level treat compartment is concealed and a solved position in which the upper level treat compartment is accessible. The drawer may be slidably coupled to the housing such that the drawer is slidable between a starting position in which the drawer treat compartment is concealed and a solved position in which the drawer treat compartment is accessible.

When the sliding door is in the starting position, the sliding door may prevent the drawer from being moved to the solved position.

The sliding door may be slidable in a first direction from the starting position to the solved position. The drawer may be slidable in a second direction from the starting position to the solved position. The first direction and the second direction may be perpendicular.

The upper level may include a plurality of upper level treat compartments and a plurality of sliding doors slidably coupled to the housing. Each of the plurality of sliding doors may be slidable between a starting position in which a corresponding upper level treat compartment is concealed and a solved position in which the corresponding upper level treat compartment is accessible. The lower level may include a plurality of drawers each including a drawer treat compartment slidably coupled to the housing. Each drawer may be slidable between a starting position in which a drawer treat compartment included in the drawer is concealed and a solved position in which the drawer treat compartment included in the drawer is accessible.

BRIEF DESCRIPTION OF THE DRAWING FIGURES

For a more complete understanding of the disclosure, reference should be made to the following detailed description and accompanying drawing figures, in which like reference numerals identify like elements in the figures.

FIG. 11 illustrates a perspective view of a sliding door in accordance with one example of the present disclosure.

Figure 1:
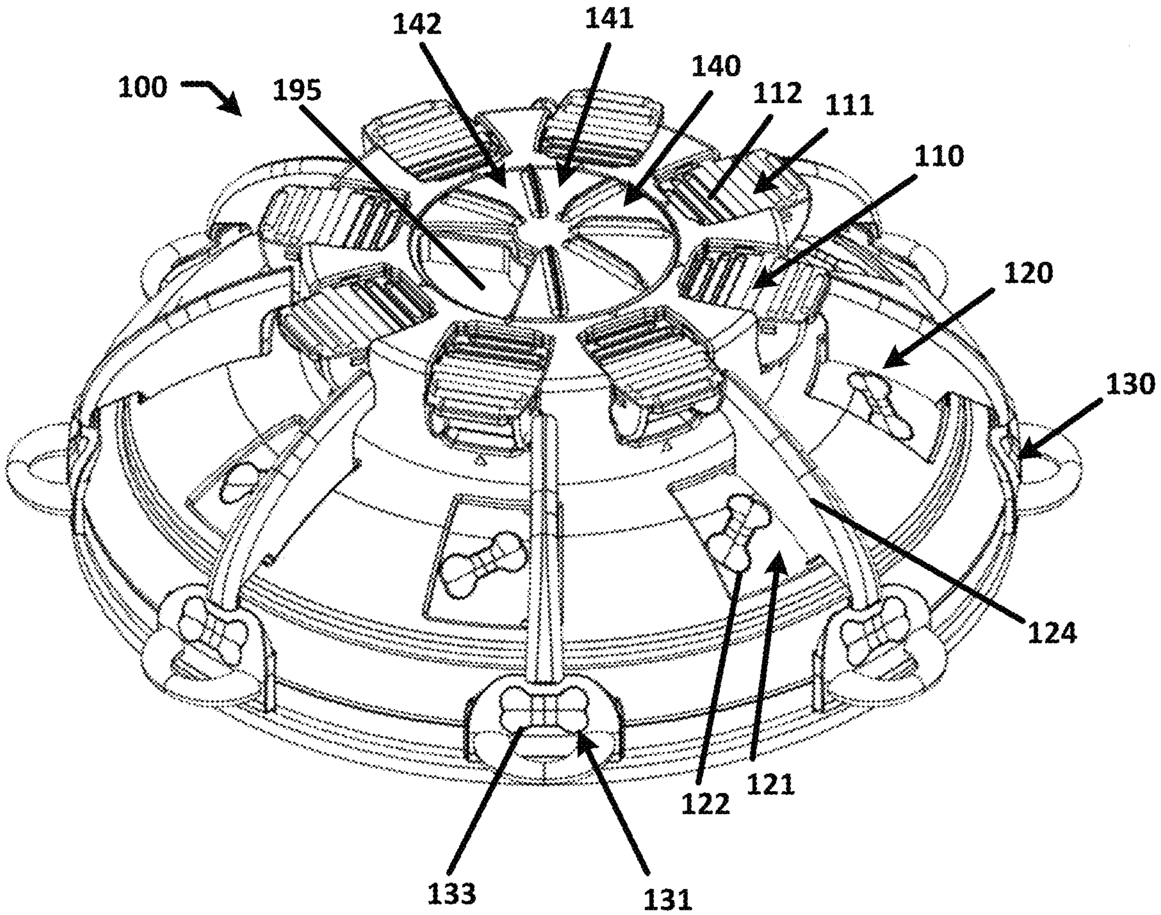
FIG. 1 illustrates a perspective view of a multilevel puzzle in accordance with one example of the present disclosure.

While the disclosed pet toys and methods are susceptible of embodiments in various forms, there are illustrated in the drawings (and will hereafter be described) specific embodiments of the disclosure, with the understanding that the disclosure is intended to be illustrative and is not intended to limit the disclosure to the specific embodiments described and illustrated herein.

DETAILED DESCRIPTION OF THE DISCLOSURE

The present disclosure is provided to solve the above-mentioned problems in the Background of the Disclosure section. Specifically, the present disclosure provides a multilevel pet puzzle that mentally stimulates pets by providing multiple puzzles to be solved and rewards pets with treats upon completion of each of the puzzles.

It should be understood that, although the terms first, second, etc. may be used herein to describe various elements, components, regions, levels, layers, and/or sections, these elements, components, regions, levels, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

For clarity of disclosure, the terms "proximal" and "distal" are defined herein relative to a center or inner core of multilevel pet puzzle. The term "proximal" refers to the position of an element closer to the center or inner core of multilevel pet puzzle and further away from the outer periphery of the multilevel pet puzzle. The term "distal" refers to the position of an element closer to the outer periphery of the multilevel pet puzzle and further away from the center or inner core of multilevel pet puzzle. Also, for clarity of disclosure, the terms "top," "upper," "bottom," and "lower" are defined herein relative to a position of the base of the multilevel pet puzzle resting on a horizontal surface, such as the ground or floor. The terms "top" and "upper" refer to the position of an element further away from the horizontal surface. The terms "bottom" and "lower" refer to the position of an element closer to the horizontal surface.

Spatially relative terms, such as "beneath," "below," "lower," "under," "above," "upper," and the like, may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As described herein, a pet puzzle includes multiple levels or layers. Each level of the pet puzzle may include a different type of puzzle to be navigated and solved by a pet, which keeps the pet busy and engaged. The various different puzzle types may be solved by a pet moving a portion of the puzzle to reveal a space in which a pet treat may be placed (i.e., a treat compartment). For example, a portion of the puzzle may be moved from a starting (e.g., closed/hidden/concealed) position to a solved (e.g., open/accessible/unconcealed) position. When the portion of the puzzle is in a solved position, a treat compartment may be accessible to a pet. In some examples, a puzzle on one level must be solved before a puzzle on a subsequent level may be solved. For example, when the movable portion of a first puzzle is in a starting position, the treat compartment associated with the portion of the first puzzle is concealed (i.e., hidden or non-accessible) and the movable portion of the first puzzle in this starting position may prevent (e.g., physically, mechanically) a movable portion of the second puzzle (as well as further subsequent levels, such as a third or fourth level) from moving from a starting position to a solved position. In other words, in this sequential solving scheme, treat compartments in subsequent levels may not be opened until the first level in the sequential solving scheme is solved.

Although described below in connection with a pet toy, the disclosed pet puzzle may also be used in various other applications. For example, the disclosed pet toy may be used as a toy for young children, for example, toddlers, or babies.

Referring generally to the Figures, the pet puzzle includes a plurality of levels or layers. In some examples the plurality of levels may include two levels. In other examples, the plurality of levels may include three levels. In other examples, the plurality of levels may include four or more levels. Each level of the puzzle may include a different type of puzzle to be navigated and solved (e.g., by a pet). Each of the different puzzle types may include a movable portion configured to be moved, such as by the pet to reveal a treat compartment (or pet owner to place treats in the treat compartment). Specifically, each puzzle type may include a movable portion that may begin in a starting position and must be moved (e.g., by a pet) to a solved position. As the movable portion of the puzzle is moved from the starting position to the solved position, a treat compartment may be revealed. When the movable portion of the puzzle is in the solved position the treat compartment may be accessible by the pet (or human). In some examples, the movable portion of each puzzle type must be moved in a specific direction or manner in order to solve the puzzle. For example, the movable portion of the puzzle must be moved upward, downward, to the left, to the right, inward, outward, or rotated to solve the puzzle and reveal a treat compartment and/or unlock another puzzle in an adjacent level. Other movements are possible as well.

In some examples, the puzzles may be solved in a specific order, such as sequentially. For example, a puzzle on a top level must be solved before a puzzle on a subsequent (e.g., lower) level of the puzzle is solved. In other examples, a puzzle on a bottom level must be solved before a puzzle on a subsequent (e.g., higher) level of the puzzle is solved. Specifically, in some examples, the movable portion of a puzzle on a first level may prevent the movable portion of a different puzzle on a subsequent (e.g., higher, lower, adjacent) level from moving from a starting position to a solved position. For example, the movable portion of the puzzle on the first level may contact the movable portion of the puzzle on the second level, physically preventing the movable portion of the puzzle on the second level from moving from the starting position to the solved position, at least until the movable portion of the puzzle on the first level is moved.

In accordance with some examples of the present disclosure, the puzzle may be set up by a human such that only the puzzles included in one level of the plurality of levels begin in the starting (i.e., locked or closed/hidden/concealed) position and the puzzles included in the other levels of the puzzle begin in the solved (i.e., unlocked or open/accessible) position. Accordingly, a pet may only have to move the puzzles in a single level, for example, puzzles having the same type to the solved position. Similarly, the puzzle may be set up such that the puzzles in some but not all of the levels begin in the starting position and have to be moved to the solved position. In some examples, alternating levels may begin in the starting position (e.g., and an intermediate level may be set to a solved position). In other examples, adjacent levels may begin in the starting position. Varying which levels and/or the number of levels that begin in the starting position may change the difficulty of the puzzle and, for example, allow a pet to learn how to solve the puzzles on each level independently (e.g., when the puzzle in adjacent levels are in solved positions).

Figure 2:
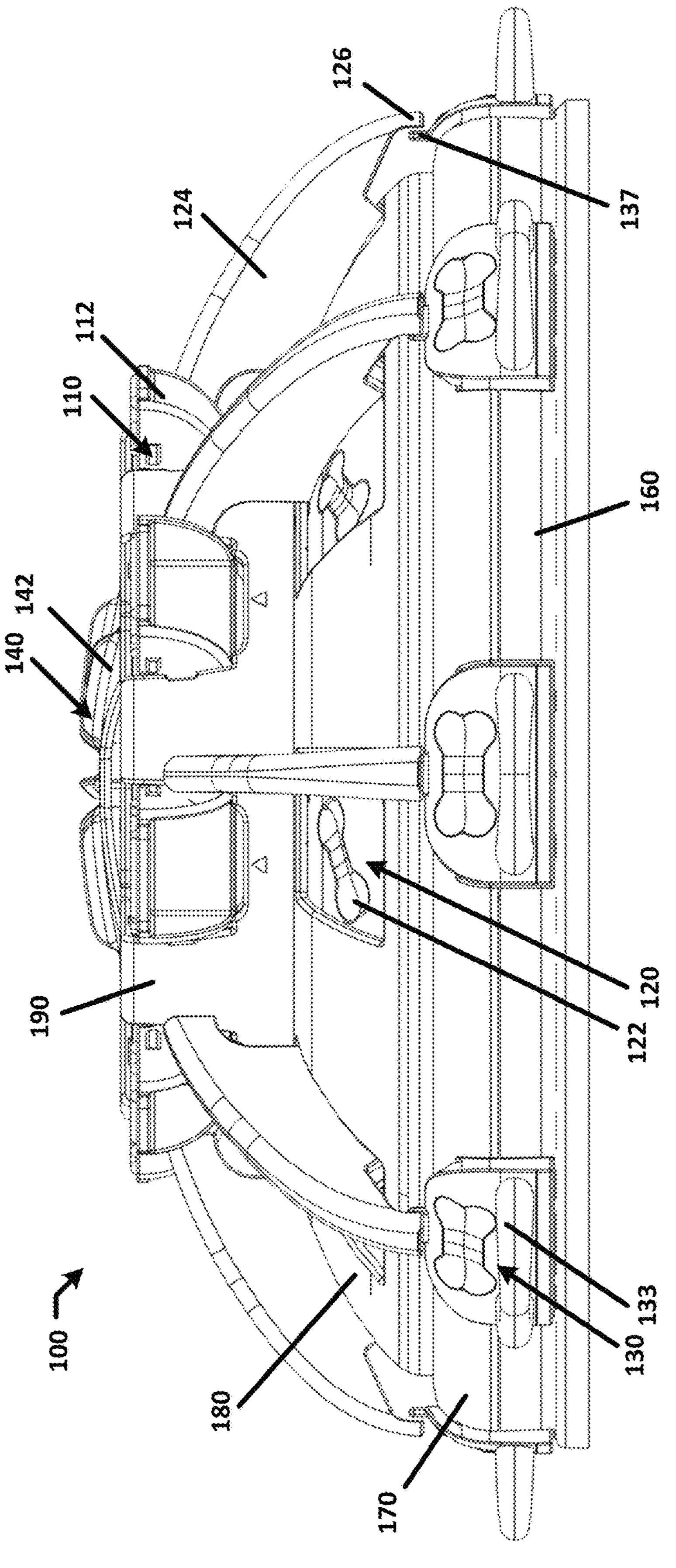
FIG. 2 illustrates a side view of a multilevel puzzle in accordance with one example of the present disclosure.
Figure 3:
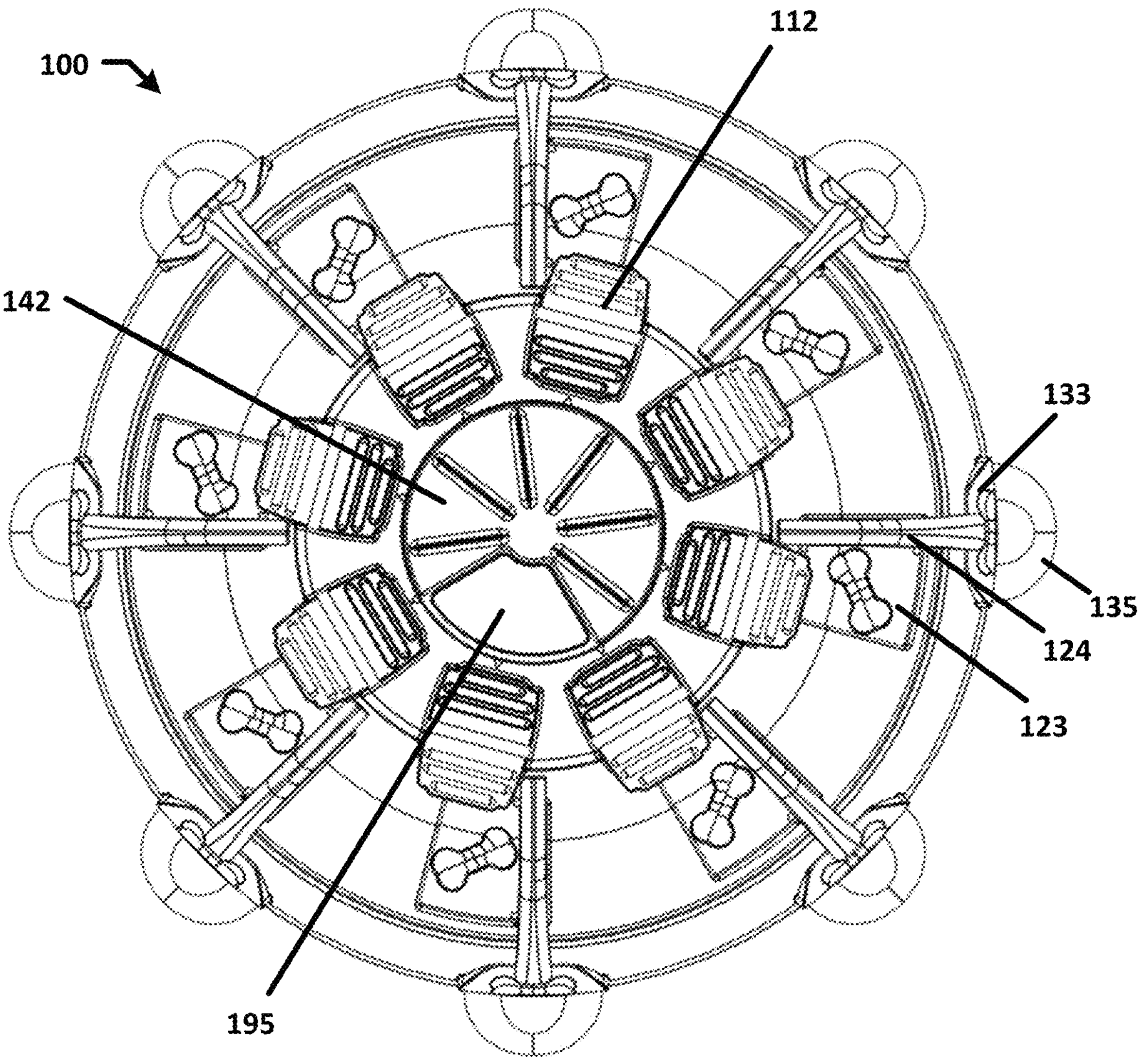
FIG. 3 illustrates a top view of a multilevel puzzle in accordance with one example of the present disclosure.
Figure 4:
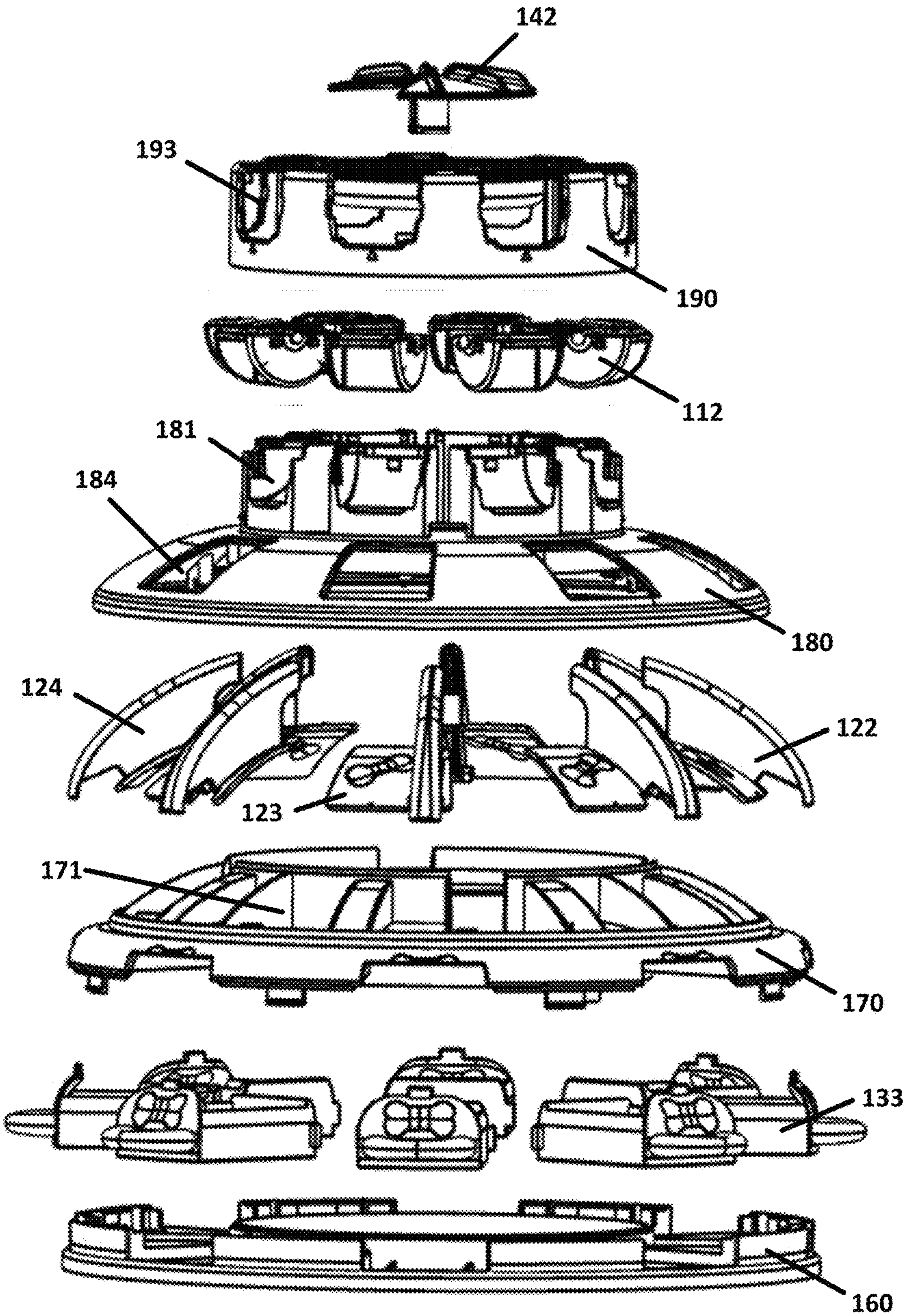
FIG. 4 illustrates an exploded view of a multilevel puzzle in accordance with one example of the present disclosure.

Referring generally to FIGS. 1-4, a multilevel puzzle 100 in accordance with one example of the present disclosure is illustrated. Referring to FIG. 4, an exploded view of a multilevel puzzle 100 in accordance with one example of the present disclosure is illustrated. As illustrated in FIG. 4, the multilevel puzzle 100 may include a revolving door 142, an upper housing 190, one or more treat wheels 112, a middle housing 180, one or more sliding doors 122, a lower housing 170, one or more drawers 133, and a base 160. As is described in greater detail below, the revolving door 142, one or more treat wheels 112, one or more sliding doors 122, and one or more drawers 133 may each comprise a movable portion of a puzzle configured to be moved from a starting position to a solved position, revealing or making a corresponding treat compartment or treat space accessible.

Figure 5:
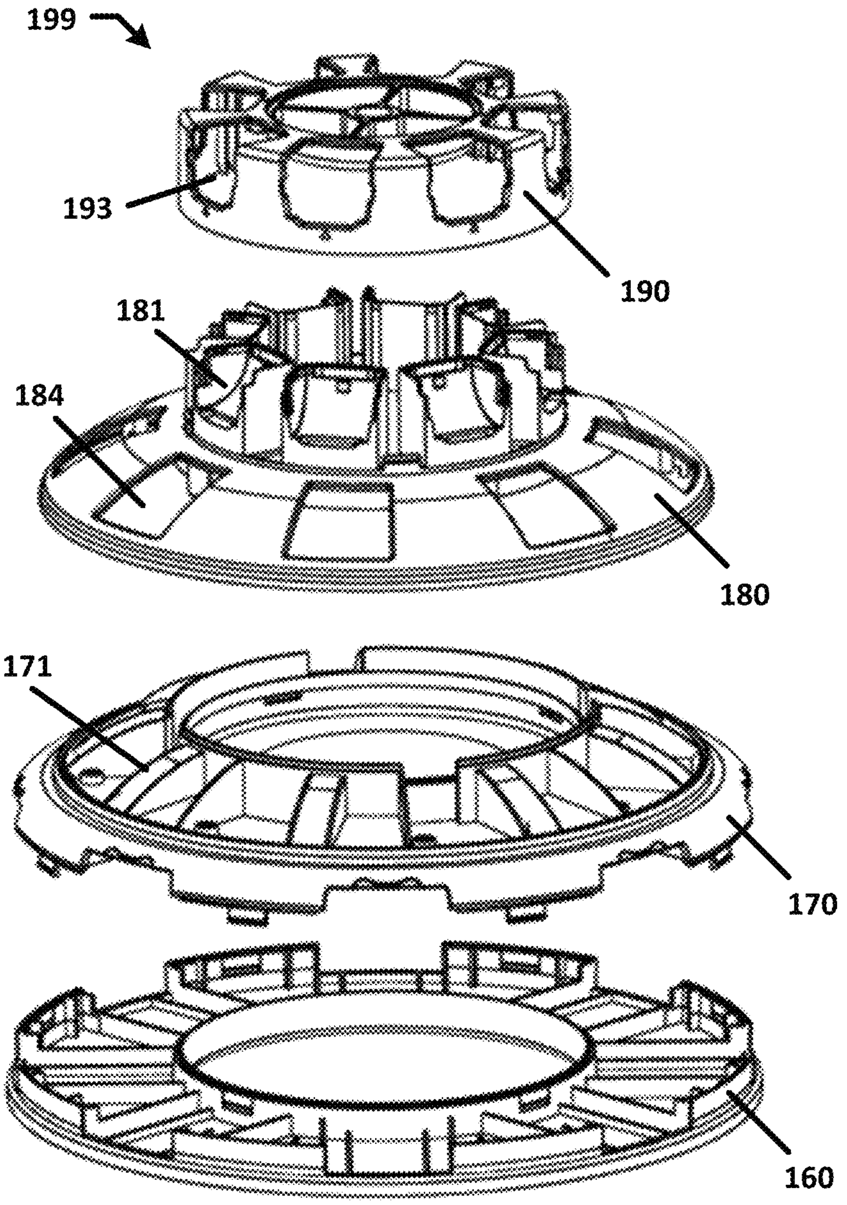
FIG. 5 illustrates an exploded view of a central housing of a multilevel puzzle in accordance with one example of the present disclosure.

Referring to FIG. 5, an exploded view of a central structure or central housing 199 of the multilevel puzzle 100 in accordance with one example of the present disclosure is illustrated. The base 160, lower housing 170, middle housing 180, and upper housing 190 may collectively form the central structure or central housing 199 of the multilevel puzzle 100. The base 160, lower housing 170, middle housing 180, and upper housing 190 may be attached or coupled to one another. Specifically, in some examples, the base 160 and the lower housing 170 may be coupled to one another, the lower housing 170 and the middle housing 180 may be coupled to one another, and/or the middle housing 180 and the upper housing 190 may be coupled to one another. In some examples, as described below in greater detail, locking features, such as protrusions and recesses, may be used to "snap" together (e.g., snap fit) or otherwise couple two or more of the base 160, the lower housing 170, the middle housing 180, and the upper housing 190. In some examples, one or more fasteners (e.g., screws, bolts, nuts, rivets, etc.), adhesives, plastic welding, or the like may be used attach or couple two or more of the base 160, the lower housing 170, the middle housing 180, and the upper housing 190. In other examples, two or more of the base 160, the lower housing 170, the middle housing 180, and the upper housing 190 may be integrally formed with one another or another component of the multilevel puzzle 100. In some examples, any two or more of the base 160, the lower housing 170, the middle housing 180, and the upper housing 190 may be removably coupled to one another to allow for easy assembly/disassembly and cleaning.

Returning to FIGS. 1-4, in some examples, as described in greater detail below, one or more of the treat wheel(s) 112, sliding door(s) 122, and drawer(s) 133 may be movably disposed between components of the central structure 199. For example, one or more treat wheels 112 may be rotatably disposed between the upper housing 190 and the middle housing 180, one or more sliding doors 122 may be slidably disposed between the middle housing 180 and the lower housing 170, and/or one or more drawers 133 may be slidably disposed between the lower housing 170 and the base 160.

Figure 6:
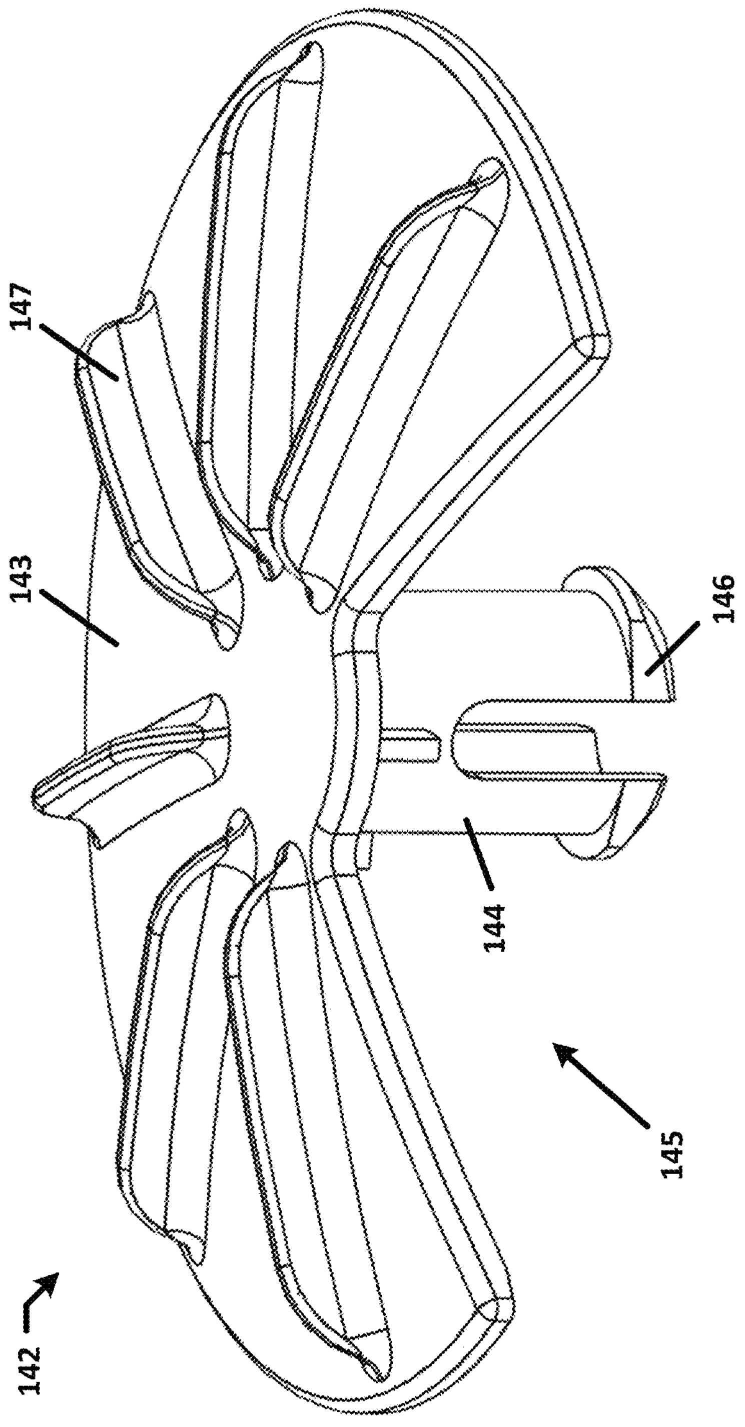
FIG. 6 illustrates a perspective view of a revolving door in accordance with one example of the present disclosure.

Referring generally to FIGS. 1-4 and 6, in some examples, the multilevel puzzle 100 may include a center wheel or revolving door 142. The revolving door 142 may be rotatably coupled to the central housing 199. Specifically, in some examples, the revolving door 142 may be rotatably coupled to the upper housing 190. Referring to FIG. 6, a revolving door 142 in accordance with one example of the present disclosure is illustrated. As illustrated in FIG. 6, the revolving door 142 may include a face 143, an opening 145, a stem 144, one or more barbs 146, and one or more paddles or blades 147.

In some examples, as illustrated in FIG. 6, the face 143 may have a generally or substantially circular shape. The face 143 of the revolving door 142 may be configured to selectively cover or conceal one or more treat compartments 195 disposed in the upper housing 190 (See FIG. 7). As illustrated in FIG. 6, the face 143 includes an opening 145. The revolving door 142 may be rotatably coupled to the upper housing 190, such that the opening 145 may be aligned with a treat compartment 195 disposed in the upper housing 190 below the revolving door 142. When the opening 145 is aligned with a treat compartment 195, the treat compartment 195 may be visible and accessible to a user (e.g., pet, human).

In some examples, as illustrated in FIG. 6, the opening 145 may have a slice or wedge shape. In other words, the opening 145 may be a wedge-shaped or pie-shaped region or cutout of the revolving door 142, such that the rest of the revolving door 142 forms a sector of a circle, for example. In other examples, the opening 145 may have another shape. For example, the opening 145 may have a circular, rectangular, oblong, or polygon shape. In some examples, the face 143 may include two or more openings 145; each of the openings 145 may provide access to a treat compartment 195 disposed below the revolving door 142.

Referring to FIG. 6, the revolving door 142 may further include a stem 144 extending or protruding from the face 143. For instance, the stem 144 may extend or protrude downwardly from the middle of the face 143 (or more specifically, downwardly from the middle of a bottom or underneath surface of the face 143), as shown in FIG. 6. In this case, the stem 144 may include a proximal end and a distal end, where the proximal end is coupled to the face 143. In some examples, the revolving door 142 may be rotatably coupled to the upper housing 190 via the stem 144. For example, the stem 144 may be inserted into a socket 194 disposed in the upper housing 190, rotatably coupling the revolving door 142 to the central structure 199 (See FIG. 7). In some examples, the distal end of the stem 144 may include one or more barbs 146. The one or more barbs 146 may be configured to maintain a position of the revolving door 142 relative to the upper housing 190. Specifically, when the revolving door 142 is coupled to the upper housing 190 the one or more barbs 146 may be inserted through the socket 194. After passing through the socket 194 the one or more barbs 146 may engage (e.g., abut, contact) a surface of the upper housing 190, preventing the revolving door 142 from being withdrawn from the socket 194. In some examples, the distal end of the stem 144 including the one or more barbs 146 may be compressed and withdrawn through the socket 194, such that the revolving door 142 may be de-coupled from the upper housing 190.

As illustrated in FIG. 6, the revolving door 142 may include one or more paddles or blades 147 extending or protruding from the face 143. For instance, the one or more blades 147 may extend or protrude upwardly from the face 143 (or more specifically, upwardly from a top or upper surface of the face 143), as shown in FIG. 6. Each of the one or more blades 147 may be configured to receive a force from a user (e.g., pet, human) for rotating the revolving door 142. For example, a dog may use its paw (or a child may use their hand) to grab or make contact with one or more blades 147 to cause the revolving door 142 to rotate. In some examples, as illustrated in FIG. 6, the blades 147 may have a linear shape. In other examples, the blades 147 may have another shape, such as, circular, oval, rectangular, or polygon shape. In some examples, as illustrated in FIG. 6, the blades 147 may be disposed radially on the top or upper surface of the face 143 of the revolving door 142.

Figure 7:
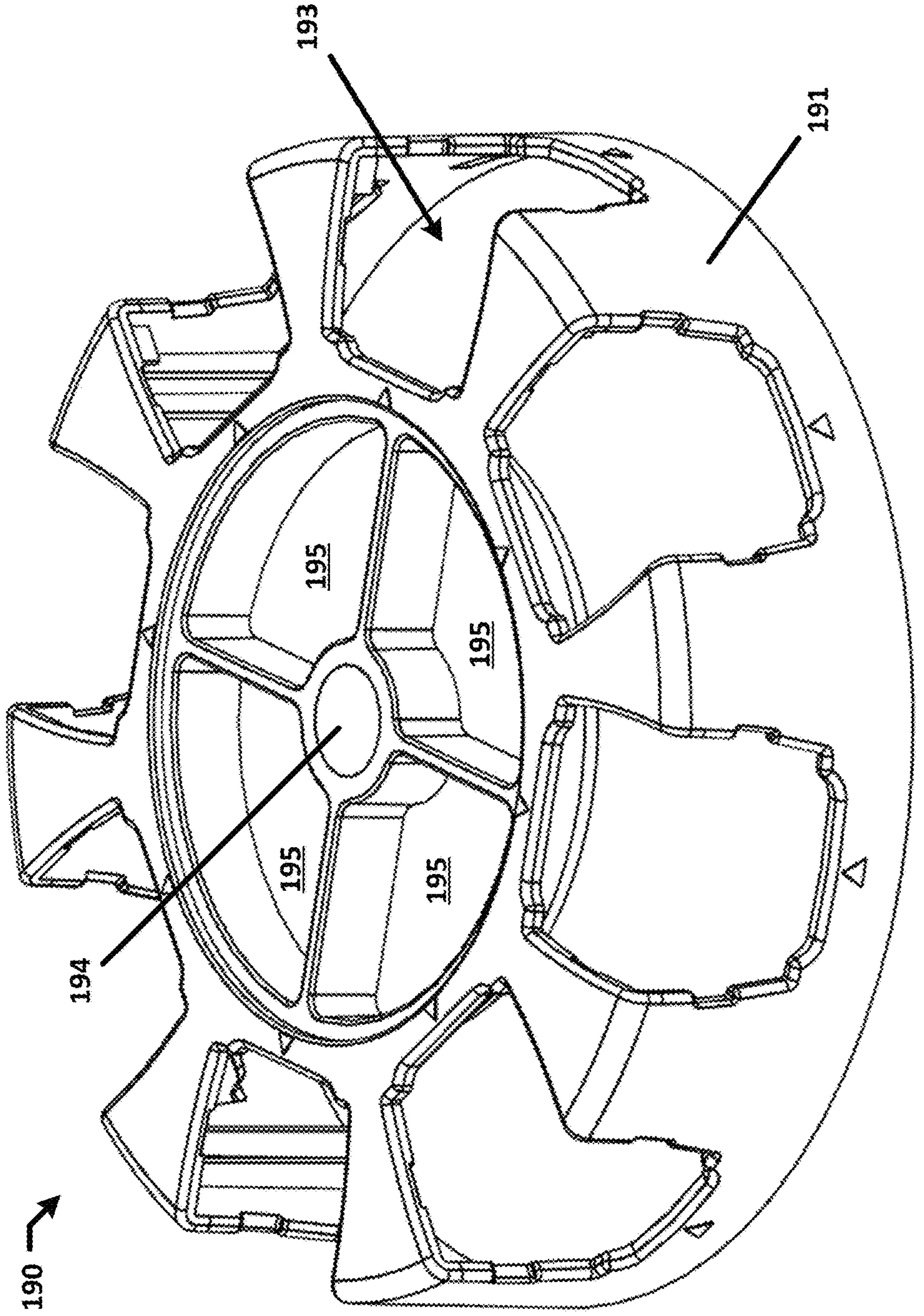
FIG. 7 illustrates a perspective view of an upper housing in accordance with one example of the present disclosure.

Referring to FIG. 7, a perspective view of the upper housing 190 in accordance with one example of the present disclosure is illustrated. The upper housing 190 may include an outer wall 191 extending downward from a perimeter of a top surface of the upper housing 190. As illustrated in FIG. 7, the upper housing 190 may include a socket 194, one or more treat compartments 195, and one or more wheel openings 193. As illustrated in FIG. 7, the upper housing 190 may have a generally cylindrical shape including a circular top surface and an outer wall 191. In other words, if not for the wheel openings 193, the top surface of the upper housing 190 would have a circular perimeter. In other examples, the upper housing 190 may be another shape, such as, a parallelepiped, a rectangular cuboid, a cube, or another shape. A top surface of the upper housing 190 may have a general shape corresponding to a general shape of the upper housing 190. For example, if the upper housing 190 is generally cylindrical in shape, the top surface may be circular. In other examples, the top surface of the upper housing 190 may have a polygon, rectangular, square, oval, or another shape.

As illustrated in FIG. 7, in some examples, the socket 194 may be disposed in a top surface of the upper housing 190. The socket 194 may be disposed, for example, in the center of the top surface. As described above, the socket 194 may be configured to receive the stem 144 of the revolving door 142, rotatably coupling the revolving door 142 to the upper housing 190. As noted above, one or more barbs 146 disposed on a distal end of the stem 144 may be inserted through the socket 194, preventing the revolving door 142 from being withdrawn from the socket 194.

The upper housing 190 may further include one or more treat compartments 195 (e.g., upper housing treat compartments 195). Each of the treat compartments 195, or treat spaces, may be disposed in a cavity in the top surface of the upper housing 190. The cavity may be defined by a cavity surface (i.e., bottom surface) and a sidewall. In some examples, the cavity sidewall may be similarly shaped to that of the top surface of the upper housing 190. As shown in FIG. 7, the cavity sidewall is circular. The cavity may also include inner walls extending between the socket 194 and the sidewall. Each treat compartment 195 or treat space may be defined by a portion of the cavity surface, the inner walls, and the sidewall. In this way, as illustrated in FIG. 7, the treat compartments 195 may be disposed radially around the socket 194. The one or more treat compartments 195 may be disposed proximate to the socket 194 so as to be selectively covered by the face 143 of the revolving door 142 or exposed by the opening 145 of the revolving door 142. In some examples, as illustrated in FIG. 7, the upper housing 190 may include four treat compartments 195. In other examples, fewer or additional treat compartments 195 may be included and may depend on the number of inner walls the cavity contains. For example, a single treat compartment 195 (in the case of no inner walls, in which case the entire cavity would be the single treat compartment 195), two treat compartments 195, three treat compartments 195 or more than four treat compartments 195 may be included. The treat compartments 195 may be formed by placing inner walls within the cavity at various locations to section off the cavity into separate spaces (i.e., treat compartments 195). The treat compartments 195 may be configured to hold food or treats for pets or humans.

As described above, the revolving door 142 may be disposed above the one or more treat compartments 195 so as to selectively cover or conceal the one or more treat compartments 195 or reveal one or more treat compartments 195. Specifically, when coupled to the upper housing 190, the face 143 of the revolving door 142 may cover some of the one or more treat compartments 195 while the opening 145 of the face 143 leaves one or more treat compartments 195 exposed. The revolving door 142 may be rotated such that the opening 145 aligns with another treat compartment 195. When the opening 145 is aligned with a treat compartment 195, the treat compartment 195 may be revealed (e.g., visible) and accessible to a user (e.g., pet, human) through the opening 145. In other words, a portion of the cavity is exposed to a user when the opening 145 of the face 143 is positioned over that portion of the cavity, thus allowing access to the treat contained therein. In some examples, the opening 145 may only provide access to one treat compartment 195 at a time, as shown in the figures. In some examples, the opening 145 may provide access to two or more treat compartments 195 at the same time. The opening 145 may provide access to less than all of the treat compartments 195 at a time.

The upper housing 190 may further include one or more wheel openings 193, which are cutouts in the surface of the upper housing 190 that are sized and shaped corresponding to a treat wheel 112 so as to be operable to receive a portion of the treat wheel 112 therein. In some examples, as described below in greater detail, a treat wheel 112 may be rotatably coupled to the central housing 199 between the middle housing 180 and the upper housing 190. When a treat wheel 112 is coupled to the central housing 199 a portion of the treat wheel 112 may extend through a corresponding wheel opening 193, as illustrated in FIG. 1. In some examples, as illustrated in FIG. 7, the one or more wheel openings 193 may be disposed radially around the perimeter of the upper housing 190. In other examples, for example, where the upper housing 190 has a non-circular shape, the one or more wheel openings 193 may be disposed along one or more sides of the upper housing 190.

In some examples, as illustrated in FIG. 7, the upper housing 190 may include eight wheel openings 193; however, the present disclosure is not limited thereto and any number of wheel openings 193 may be included. For example, the upper housing 190 may include a single wheel opening 193, two wheel openings 193, three wheel openings 193, four wheel openings 193, six wheel openings 193, or more than 8 wheel openings 193. A corresponding number of wheel openings 193 and treat wheels 112 may be provided.

Figure 8:
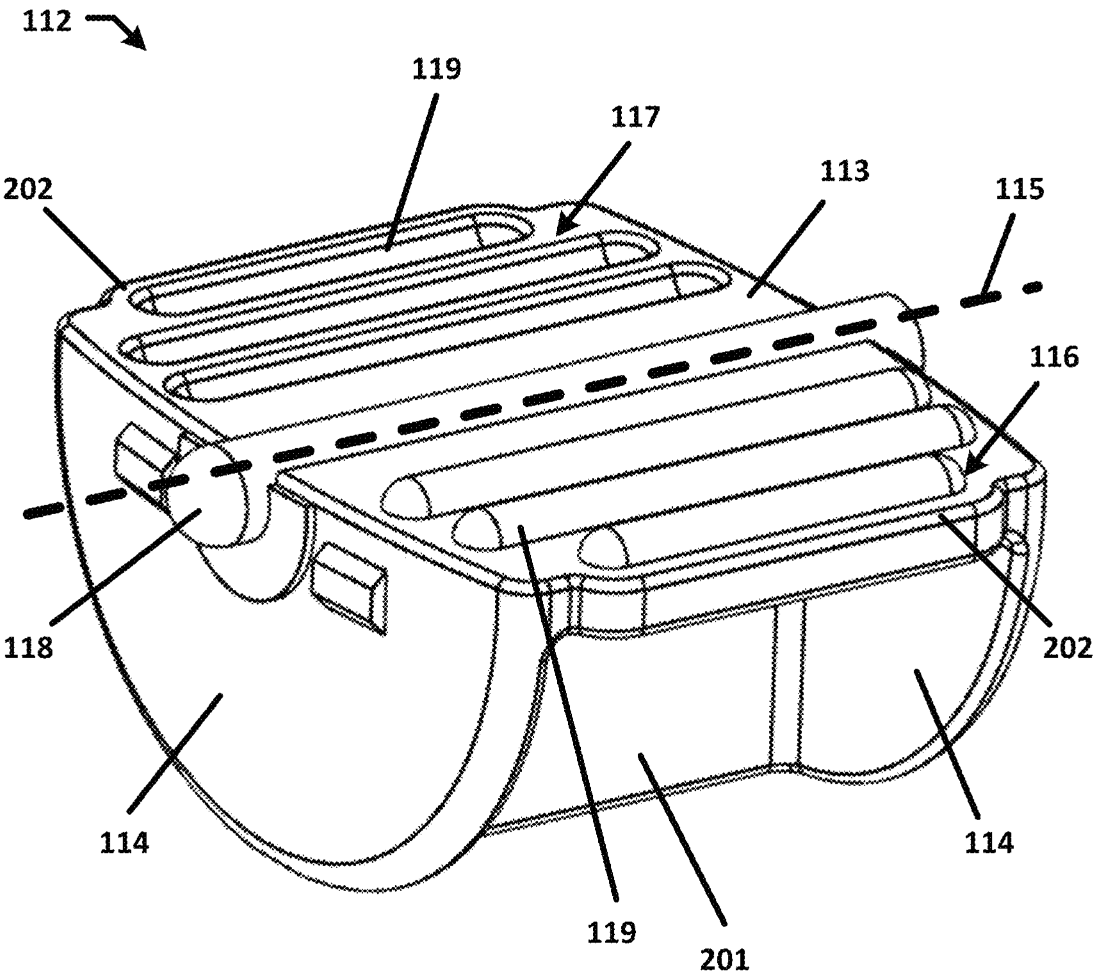
FIG. 8 illustrates a perspective view of a treat wheel in accordance with one example of the present disclosure.

Referring to FIG. 8, a perspective view of a treat wheel 112 in accordance with one example of the present disclosure is illustrated. As noted above, in some examples, the treat wheel 112 may be rotatably coupled to the central housing 199 between the middle housing 180 and the upper housing 190. Specifically, as illustrated in FIG. 8, the treat wheel 112 may include a shaft 118 which may be disposed between the middle housing 180 and the upper housing 190 and about which the treat wheel 112 may rotate. As shown in FIG. 8, the shaft 118 may be disposed along the minor axis 115 of the treat wheel 112 and extend or protrude from opposite sides of the treat wheel 112.

Figure 9:
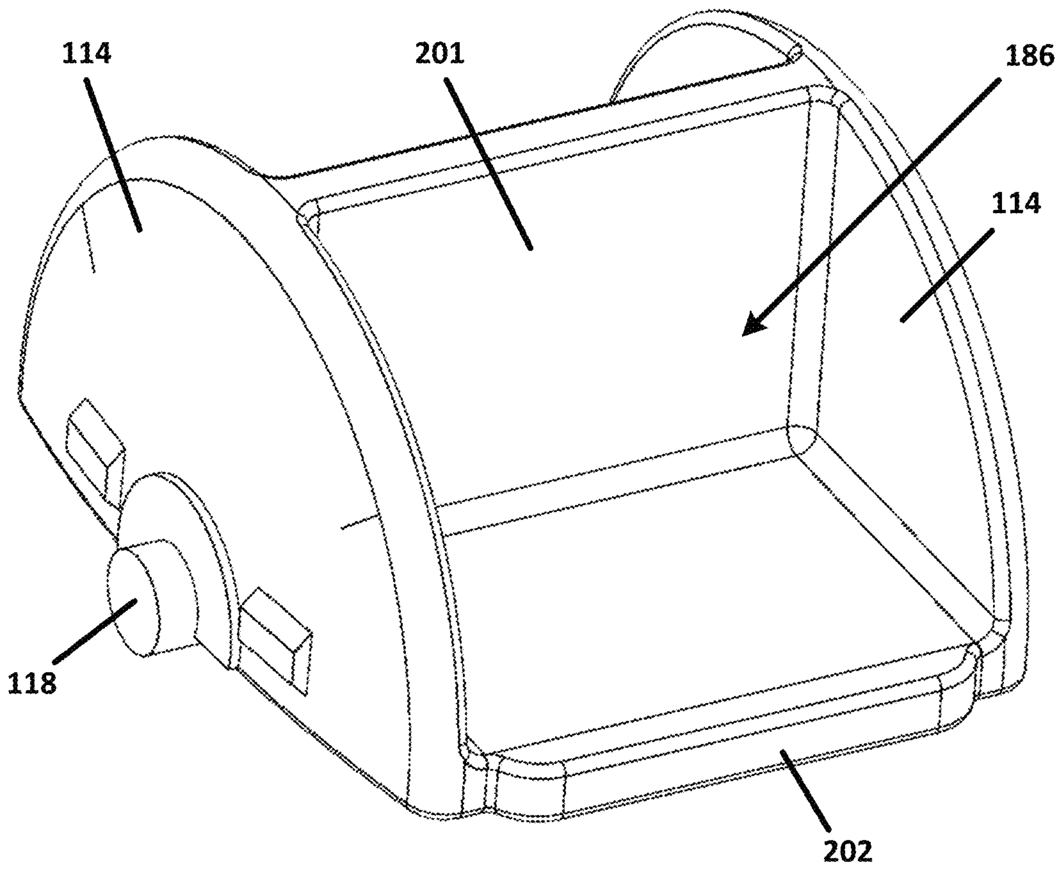
FIG. 9 illustrates a bottom perspective view of the treat wheel of FIG. 8 in accordance with one example of the present disclosure.

In some examples, the treat wheel 112 may have a semicylindrical shape. Specifically, the treat wheel 112 may include a flat top surface 113, curved (e.g., semicircular) sidewalls 114, and a central wall or plate 201 coupled to and spanning between the sidewalls 114. The central plate 201 may be coupled to the middle of the sidewalls 114 and a center portion of the top surface 113 below the shaft 118, thus aligning with the minor axis 115 of the treat wheel 112. In this regard, the top surface 113 and the central plate 201 form a t-beam type structure. Referring to FIG. 9, a bottom perspective view of the treat wheel 112 illustrating the sidewalls 114 and the central plate 201 is shown. In some examples, the top surface 113 may have a rectangular (e.g., substantially rectangular) shape. In some examples, the top surface 113 may further include on or more texture features 119, for example, grooves and/or ridges, configured provide texture to the top surface 113, allowing a user to more easily grip and rotate the treat wheel 112. In another example, the texture features 119 may include slots or openings in the top surface 113, allowing a user to see and/or smell a treat hidden behind/under the top surface 113. In some examples, the shaft 118 of the treat wheel 112 may extend through the minor axis 115 of the top surface 113. The treat wheel 112 may be configured to rotate about the shaft 118 and/or the minor axis 115 of the top surface 113. The minor axis 115 (and in some examples, the shaft 118) may divide the top surface 113 into an outer half 116 (e.g., radially outward half when coupled to the central housing 199) and an inner half 117 (e.g., radially inward half when coupled to the central housing 199). The ends of the outer half 116 and inner half 117 of the top surface 113 extend or protrude outwardly (e.g., away from the minor axis 115) past the sidewalls in a longitudinal direction, so as to form flanges 202 on opposite lengthwise ends of the top surface 113. In some examples, the top surface 113 of the treat wheel may include an image of a treat, so as to alert or inform a user (e.g., pet, human) as to a treat hidden behind the treat wheel 112 when the treat wheel 112 is in the starting position. In other examples, the treat wheel 112 may have another shape. For example, the treat wheel 112 may have a cylindrical shape. In some examples, the treat wheel 112 may include an image 101 of a treat, so as to alert or inform a user (e.g., pet, human) as to the treat hidden behind the treat wheel 112, when the treat wheel 112 is in a starting position. In other examples, the treat wheel 112 may include an image 101 of a number, for example, indicating an order in which the multiple puzzles or levels of puzzles must be solved. The image 101 may be disposed, for example, on the top surface 113 or sidewalls 114 of the treat wheel 112.

Figure 10:
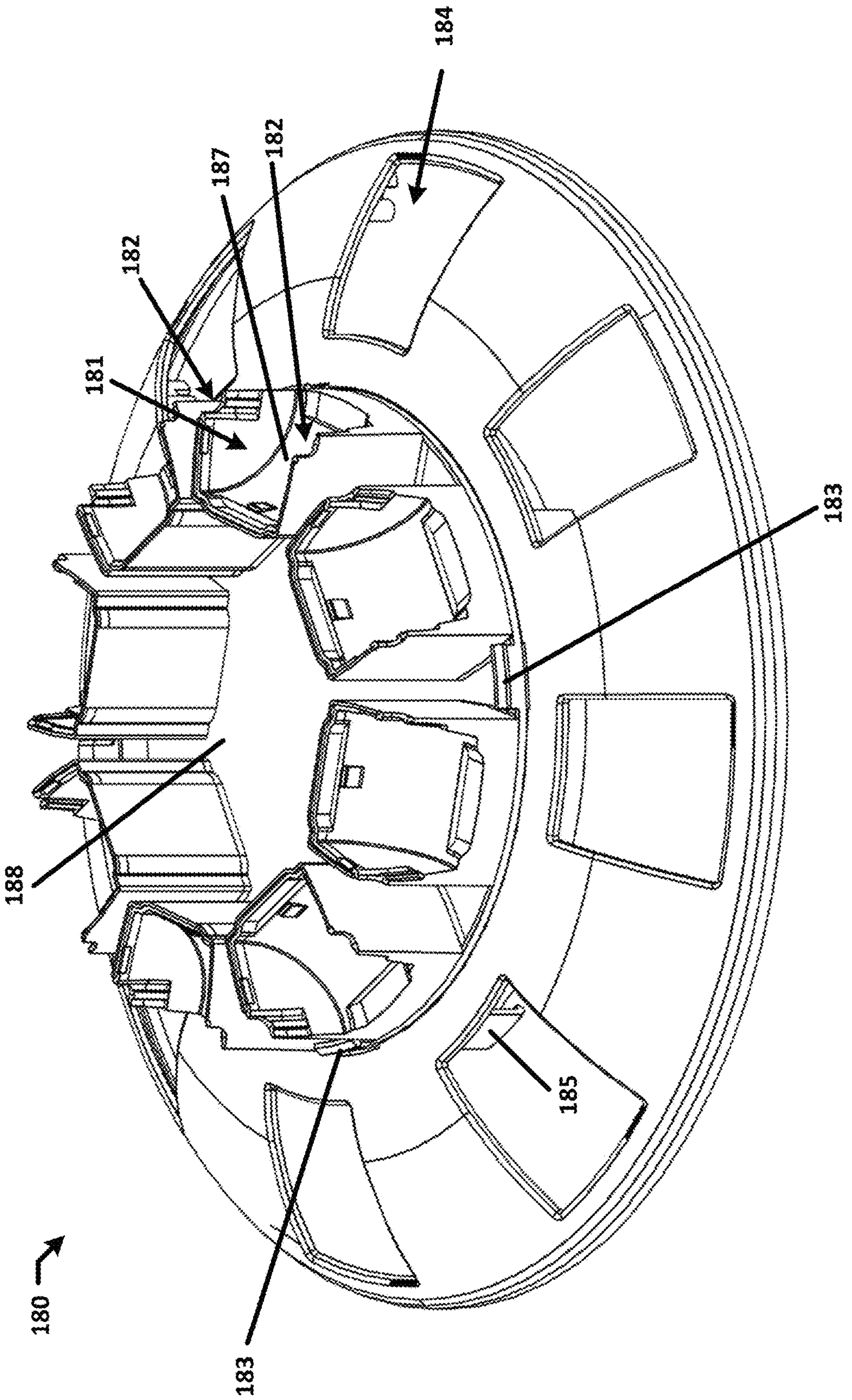
FIG. 10 illustrates a perspective view of a middle housing in accordance with one example of the present disclosure.

Referring to FIG. 10, a perspective view of a middle housing 180 in accordance with one example of the present disclosure is illustrated. In some examples, as illustrated in FIG. 10, the middle housing 180 may have a generally circular shape. In other examples, the middle housing 180 may have another shape, such as, a ring, rectangular, square, oval, polygon, or another shape. As illustrated in FIG. 10, the middle housing 180 may include one or more wheel bays 181 and one or more windows 184. Each of the wheel bays 181 may be configured to receive a treat wheel 112 rotatably coupled to the central housing 199 and each of the windows 184 may be configured to receive a portion of a sliding door 122 slidably coupled to the central housing 199.

In some examples, as illustrated in FIG. 10, a corresponding number of wheel bays 181 and windows 184 may be provided. In some examples, each window 184 may be disposed proximate to a corresponding wheel bay 181, such that a treat wheel 112 and a sliding door 122 disposed in the wheel bay 181 and window 184, respectively, may interact with one another. Specifically, as described below in greater detail, in some positions (e.g., a starting position) a treat wheel 112 disposed proximate to a correspond sliding door 122 may contact or abut the sliding door 122, preventing the sliding door 122 from being moved to a solved position. Close proximity of corresponding wheel bays 181 and windows 184 may allow interaction between the treat wheel 112 and sliding door 122 coupled to the wheel bay 181 and window 184, respectively. In some examples, each wheel bay 181 may be disposed above a corresponding window 184 such that a treat wheel 112 coupled to the wheel bay 181 may interact with a sliding door 122 extending through the window 184 and disposed below the treat wheel 112.

In some examples, as illustrated in FIG. 10, the one or more wheel bays 181 may be disposed radially on the middle housing 180 (e.g., radially along an upper surface 188 of the middle housing 180 proximate to an outer periphery or perimeter of the upper surface 188). In other examples, the one or more wheel bays 181 may be disposed linearly on the middle housing 180 (e.g., parallel to a side of the upper surface 188 of the middle housing 180, parallel to a side of the middle housing 180, and/or parallel to a side of the upper housing 190). In some examples, the one or more wheel bays 181 may be disposed between a center of the middle housing 180 and the one or more windows 184. Each wheel bay 181 may be configured to receive a treat wheel 112; a corresponding number of wheel bays 181 and treat wheels 112 may be provided.

As illustrated in FIG. 10, each wheel bay 181 may further include a base portion coupled to the middle housing 180, opposing sidewalls extending vertically from the base portion, an inner wall (inner referring to a direction towards the center of the middle housing 180) extending vertically from the base portion, and a wheel bay surface 187 disposed between the inner wall and opposing sidewalls. In one example, as shown in FIG. 10, the wheel bay surface 187 extends in a curved manner from one end disposed near the top of the inner wall and opposing sidewalls to another end disposed proximate the base portion of the wheel bay 181. In this regard, the shape of the wheel bay surface 187 accommodates a corresponding treat wheel 112 to be received and rotated within the wheel bay 187, as described below. Each sidewall of the wheel bay 181 may further include one or more notches 182. Specifically, the wheel bay 181 may include two notches 182 (one in each sidewall). As illustrated in FIG. 10, the notches 182 may be disposed in the opposing sidewalls (e.g., left and right) of the wheel bay 181. In some examples, as illustrated in FIG. 10, the notches 182 may be formed in a top and/or front portion of the opposing sidewalls of the wheel bay 181.

Each of the notches 182 may be configured to receive a portion of the shaft 118 of the treat wheel 112. As noted above, a treat wheel 112 may be rotatably coupled to the central housing 199 between the middle housing 180 and the upper housing 190. In operation, the shaft 118 of a treat wheel 112 is positioned in the notches 182 of the wheel bay 181, which allows the treat wheel 112 to rotate within the wheel bay 181. A first ledge may be formed at the upper/top end of the inner wall and wheel bay surface 187. The first ledge is shaped to correspond to the shape of the flange of the inner half 117 of the top surface 113 of the treat wheel 112, such that the flange of the inner half 117 of the top surface 113 of the treat wheel 112 contacts the first ledge in a starting/first position, thus prohibiting a counter-clockwise rotation of the treat wheel 112. A similarly shaped cutout with a second ledge may be disposed where the wheel bay surface 187 meets the base portion of the wheel bay 181 (i.e., at the lower/bottom portion of the wheel bay surface 187). In operation, as the treat wheel 112 is rotated in a clockwise direction from the starting/first position to the solved/second position, the flange of the outer half 116 of the top surface 113 of the treat wheel 112 contacts the second ledge, thus prohibiting further rotation of the treat wheel 112 in the clockwise direction.

Referring generally to FIGS. 7-10, the upper housing 190 may be coupled to the middle housing 180 so as to retain or lock the shaft 118 of a treat wheel 112 in the notches 182 of the wheel bay 181. Specifically, the upper housing 190 may be coupled to the middle housing 180 so as to be disposed above or on top of the middle housing 180. When the upper housing 190 is coupled to the middle housing 180, each end of the shaft 118 may be disposed in a notch 182 of the wheel bay 181 between the middle housing 180 and the upper housing 190. Accordingly, the upper housing 190 and the middle housing 180 may collectively maintain the shaft 118 of the treat wheel 112 in the notches 182 of the wheel bay 181. A portion of the treat wheel 112 may extend through the wheel opening 193 and the treat wheel 112 may be free to rotate about the shaft 118. When the treat wheel 112 is coupled to the central housing 199 and the shaft 118 is rotatably received in the notches 182 of the wheel bay 181, a treat compartment 186 is formed. As best seen in FIG. 9, the treat compartment 186 is a space where a treat may be placed and is defined by the inner half 117 of the top surface 113 of the treat wheel 112, portions of the sidewalls 114 of the treat wheel 112 adjacent the inner half 117 of the top surface 113, the central plate 120 of the treat wheel 112, and the wheel bay surface 187. As described in greater detail below, the treat wheel 112 may be configured to rotate from a starting position in which a corresponding treat compartment 186 is hidden or concealed to a solved position in which the corresponding treat compartment 186 is revealed (e.g., visible) and accessible.

Figure 11:
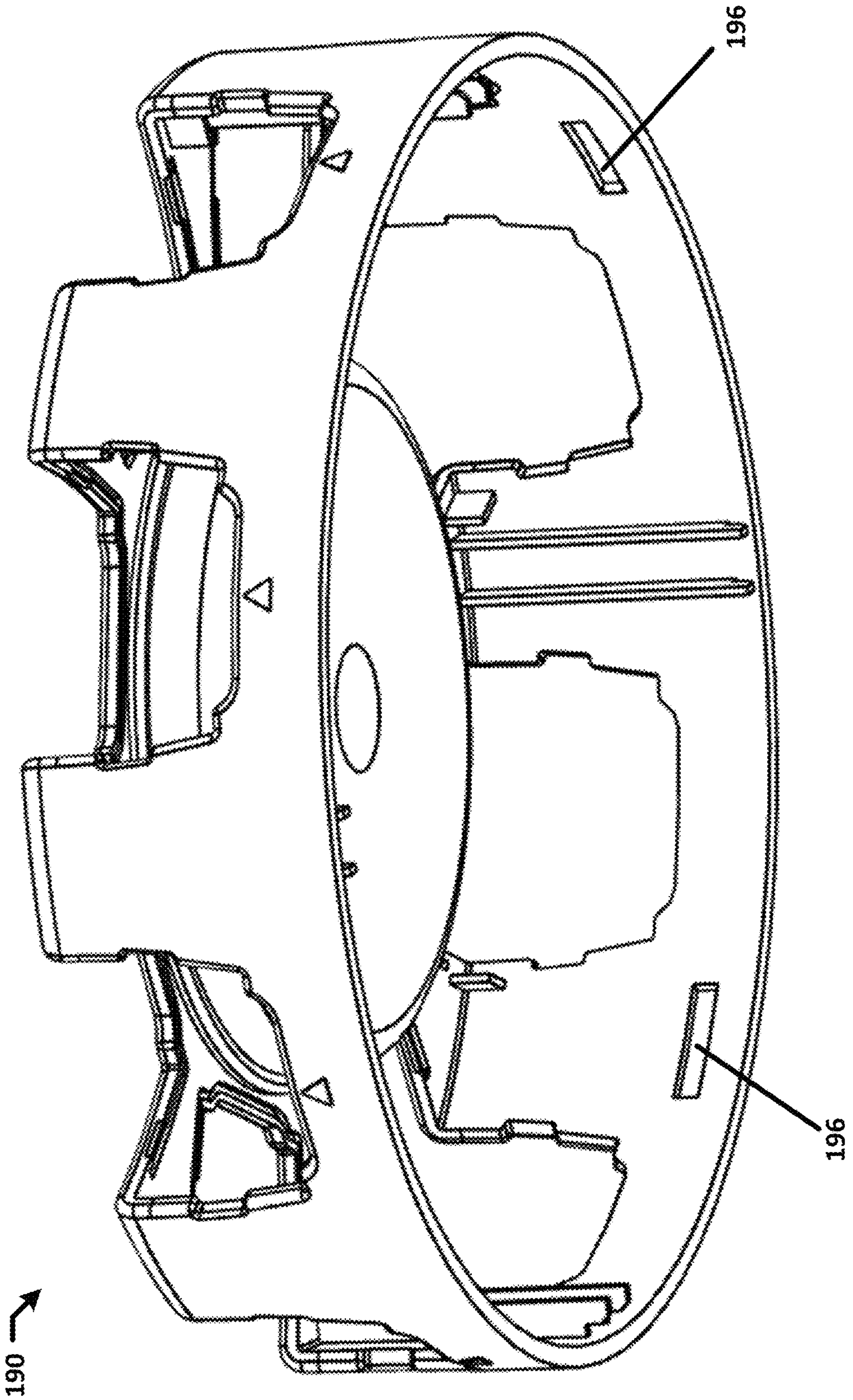
FIG. 11 illustrates a bottom perspective view of an upper housing in accordance with one example of the present disclosure.

One or more locking features may be used to couple the upper housing 190 and the middle housing 180. Specifically, as illustrated in FIG. 10, the middle housing 180 may include one or more locking tabs 183 extending or protruding (e.g., upwards) from the middle housing 180. Referring to FIG. 11, a bottom perspective view of the upper housing 190 in accordance with one example of the present disclosure is illustrated. As shown in FIG. 11, the upper housing 190 may include one or more recesses 196. The one or more recesses 196 may be disposed on an inner surface of the upper housing 190. Each of the recesses 196 may be configured to receive a locking tab 183 of the middle housing 180, coupling the middle housing 180 and the upper housing 190. The same number of locking tabs 183 and recesses 196 may be provided. The one or more locking tabs 183 may be disposed within the upper housing 190 when the middle housing 180 and the upper housing 190 are coupled to one another.

The treat wheel 112 may be configured to rotate when force is applied to the top surface 113. Specifically, the treat wheel 112 may be configured to move or rotate from a starting position in which a treat compartment 186 described above is concealed to a solved position in which the treat compartment 186 is revealed (e.g., visible) and accessible to a user (e.g., pet, human). Specifically, the treat wheel 112 may be configured to rotate in a first direction when a downward force is applied to the outer half 116 of the top surface 113. As a downward force is applied to the outer half 116 of the top surface 113, the treat wheel 112 rotates in the first direction and the outer half 116 of the top surface 113 may move downward while the inner half 117 of the top surface 113 may move upward. In some examples, the first direction may be a clockwise direction. Once the treat wheel 112 is in the solved position, force may be applied to the inner half 117 of the top surface 113 to rotate the treat wheel 112 in a second direction (e.g., counter-clockwise direction), such that the treat wheel 112 returns to the starting position.

In some examples, as illustrated in FIG. 1, when the treat wheel 112 is in a starting position the top surface 113 of the treat wheel 112 may be horizontal (e.g., substantially horizontal). Further, in some examples, when the treat wheel 112 is in the solved position the top surface 113 of the treat wheel 112 may be vertical (e.g., substantially vertical). Accordingly, the treat wheel 112 may be configured to rotate 90° from the starting position to the solved position. In some examples, when the treat wheel 112 is in the solved position, the top surface 113 of the treat wheel 112 may be flush or even with an outer wall 191 of the upper housing 190 (See FIG. 7). In some examples, after being moved to the solved position, the treat wheel 112 may remain in the solved position until a user exerts another force on the treat wheel 112, as described above.

Returning to FIG. 10, the middle housing 180 may further include one or more windows 184, or cutouts in the middle housing 180. As noted above, a corresponding number of wheel bays 181 and windows 184 may be provided and each window 184 may be disposed proximate to a corresponding wheel bay 181. For example, each window 184 may be disposed below and/or slightly offset (e.g., radially) from a corresponding wheel bay 181. Specifically, each window 184 may be disposed proximate to a corresponding wheel bay 181, such that a sliding door 122 extending through the window 184 may interact with (e.g., contact, abut) a treat wheel 112 disposed in the corresponding wheel bay 181.

In some examples, the one or more windows 184 may be disposed radially around the middle housing 180. The one or more windows 184 may be disposed below the one or more wheel bays 181. In some examples, as described in greater detail below, a sliding door 122 may be slidably coupled to the central housing 199 between the middle housing 180 and the lower housing 170. As illustrated in FIG. 1, a portion of each sliding door 122 may extend through a corresponding window 184 when the sliding door 122 is coupled to the central housing 199. The sliding doors 122 and windows 184 may be provided in corresponding numbers. In some examples, as illustrated in FIG. 10, the middle housing 180 may include eight windows 184; however, the present disclosure is not limited thereto, and the middle housing 180 may include less than eight windows 184 or more than eight windows 184.

Figure 12:
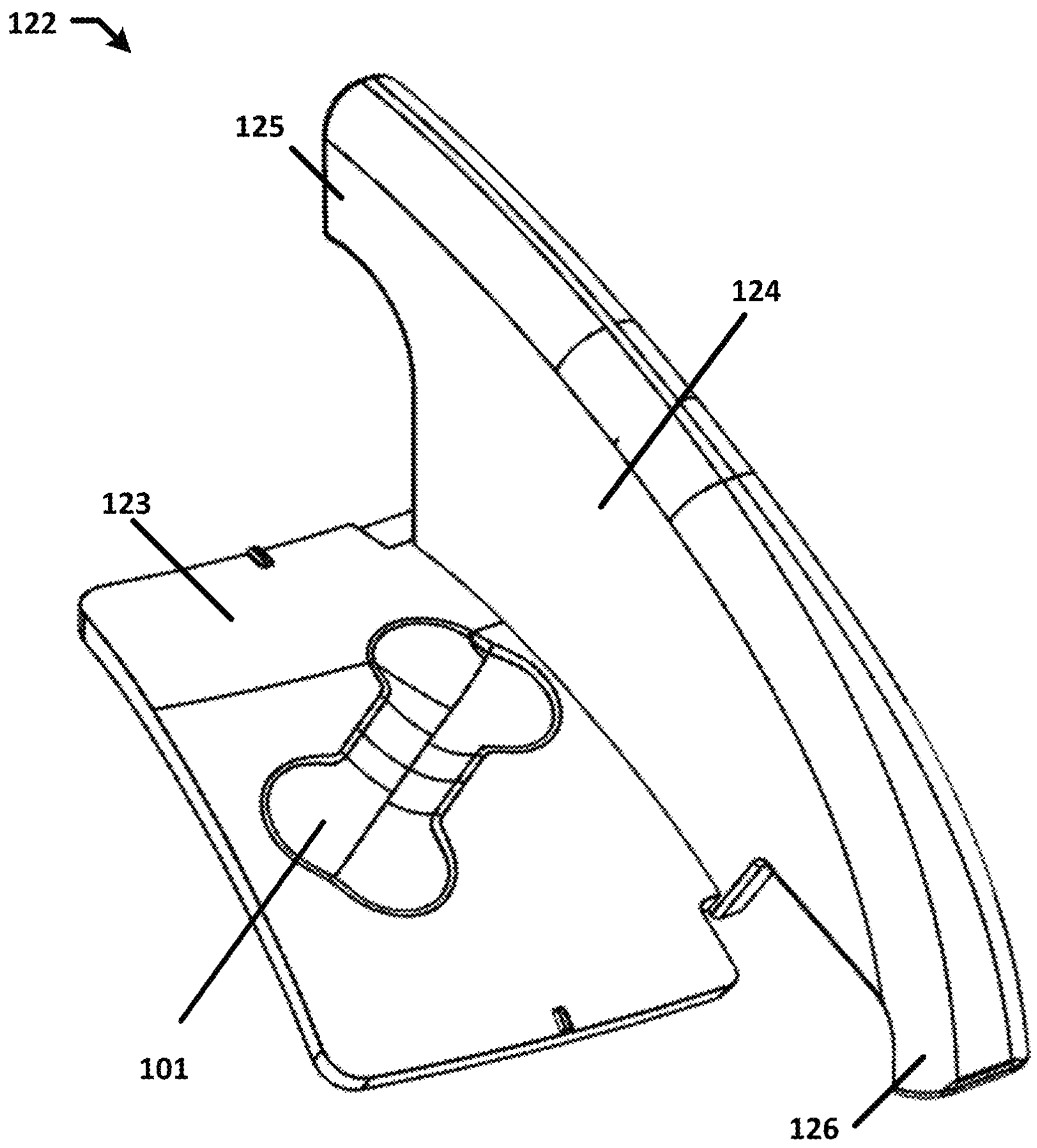

Referring to FIG. 12, a perspective view of a sliding door 122 in accordance with one example of the present disclosure is illustrated. As noted above, the sliding door 122 may be movably (e.g., slidably) coupled to the central housing 199. Specifically, as described below in greater detail, the sliding door 122 may be slidably disposed between the middle housing 180 and the lower housing 170. The sliding door 122 may be coupled to the central housing 199 so as to be selectively movable (e.g., slidable) between a starting position in which a treat compartment 174 disposed in the lower housing 170 proximate to the sliding door 122 is covered or concealed to a solved position in which the treat compartment 174 is revealed (e.g., visible) and accessible to a user (e.g., pet, human) (See treat compartment 174 in FIG. 13). As illustrated in FIG. 12, the sliding door 122 may include a gate 123 and a paddle 124.

The gate 123 may be configured to selectively cover or conceal a treat compartment 174 included in the lower housing 170. Specifically, when the sliding door 122 is in the starting position, the gate 123 may cover the treat compartment 174 and the treat compartment 174 may be concealed and inaccessible. In one example, the gate 123 may have a bent or curved quadrilateral shape. Specifically, as illustrated in FIG. 12, the gate 123 may have a bent or curved rectangular shape. For example, as illustrated in FIG. 12, the top and bottom sides of the gate 123 may be shorter than the left and right sides of the gate 123. In some examples, the gate 123 may include an image 101 of a treat, so as to alert or inform a user (e.g., pet, human) as to the treat compartment 174 disposed behind the gate 123 when the sliding door is in a starting position. In the example shown in FIG. 12, the image 101 is an image of a bone, but other images may be used. In other examples, the gate 123 may include an image 101 of a number, for example, indicating an order in which the multiple puzzles or levels of puzzle must be solved.

As illustrated in FIG. 12, the sliding door 122 may further include a paddle 124. The paddle 124 may extend or protrude from the gate 123. Specifically, the paddle 124 may extend away from the gate 123 and the central housing 199 so as to be substantially perpendicular to the gate 123. In this regard, the paddle 124 is configured to receive a force from a user (e.g., pet, human) for moving the sliding door 122 (e.g., from the starting position to the solved position).

In some examples, the paddle 124 may extend or protrude from an outer face of the gate 123 along a side of the gate 123. For example, as illustrated in FIG. 12, the paddle 124 may extend or protrude from the gate 123 along a right side of the gate 123. In some examples, the paddle 124 may control a range of movement of the sliding door 122. For example, the paddle 124 may abut a first side of the window 184 when the sliding door 122 is in the starting position and the paddle 124 may abut a second, opposite side of the window 184 when the sliding door 122 is in the solved position. In some examples, the size of the paddle 124 may increase as a distance from the gate 123 increases. For example, the length of an outermost/distal edge or side of the paddle 124 (i.e., the side or edge furthest away from the gate 123) may be longer than an innermost/proximal edge or side of the paddle 124 (i.e., the side or edge closest to, or coupled to, the gate 123). In this way, opposite ends of the outermost or distal edge of the paddle 124 overhang the innermost or proximal edge of the paddle 124.

In some examples, the paddle 124 may include an upper latch or overhang 125. The upper overhang 125 may be disposed at an end of the distal side of the paddle 124. Specifically, in some examples, the upper overhang 125 may be disposed at an uppermost or top end of the distal side of the paddle 124 ("uppermost" and "top" referring to the direction towards the top of the multilevel puzzle 100). The upper overhang 125 may be configured to interact with a treat wheel 112 disposed adjacent or proximate to the paddle 124. Specifically, in some examples, as described in more detail below, the upper overhang 125 may abut the treat wheel 112 preventing the sliding door 122 from being moved from a starting position to a solved position when the treat wheel 112 is in a starting position.

In some examples, the paddle 124 may further include a lower latch or overhang 126. The lower overhang 126 may be disposed at an end of the distal side of the paddle 124. Specifically, in some examples, the lower overhang 126 may be disposed at a lower most or bottom end of the distal side of the paddle 124 ("lowermost" and "bottom" referring to the direction towards the bottom of the multilevel puzzle 100). The lower overhang 126 may be configured to interact with a drawer 133 disposed adjacent or proximate to the paddle 124. Specifically, in some examples, as described in greater detail below, the lower overhang 126 may abut a drawer 133 preventing the drawer 133 from being moved from a starting position to a solved position when the sliding door 122 is in the starting position. In some examples, the upper overhang 125 and the lower overhang 126 may be disposed at opposite ends of the distal side of the paddle 124. The upper overhang 125 may be disposed above the lower overhang 126.

Figure 13:
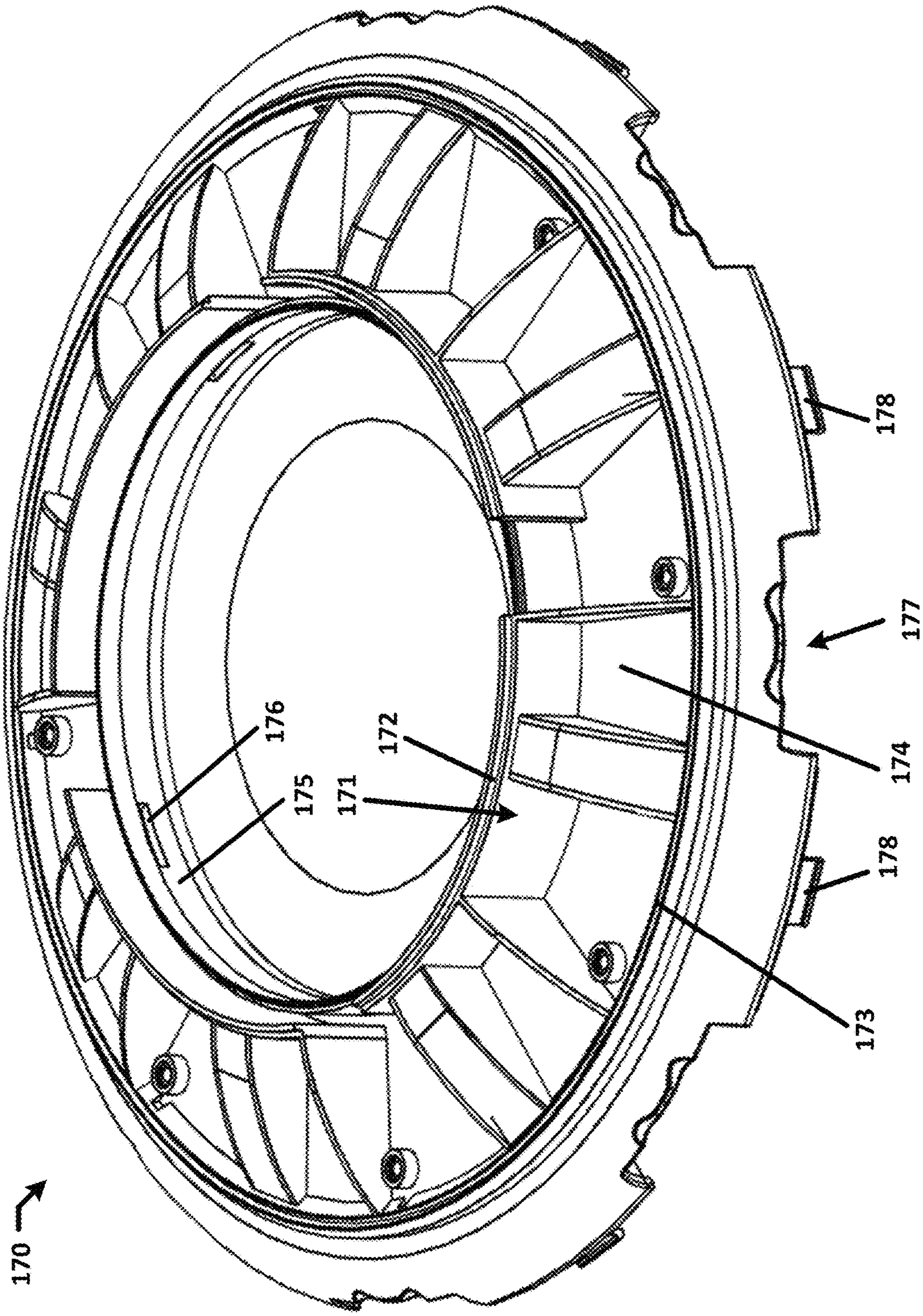
FIG. 13 illustrates a perspective view of a lower housing in accordance with one example of the present disclosure.

Referring to FIG. 13, a lower housing 170 in accordance with one example of the present disclosure is illustrated. In some examples, as illustrated in FIG. 13, the lower housing 170 may have a circular ring shape. In other examples, the lower housing 170 may have another shape, such as, a rectangular, square, oval, polygon, or another shape. As illustrated in FIG. 13, the lower housing 170 may include one or more sliding door modules 171 and one or more upper passages 177.

In some examples, as illustrated in FIG. 13, the one or more sliding door modules 171 may be disposed radially around the lower housing 170. In other examples, the one or more sliding door modules 171 may be disposed linearly on the lower housing 170 (e.g., parallel to or along a side or sides of the lower housing 170). A corresponding number of sliding door modules 171 and sliding doors 122 may be provided and each of the sliding door modules 171 may be configured to receive a sliding door 122. Specifically, a sliding door 122 may be disposed on each of the sliding door modules 171 when the sliding door 122 is coupled to the central housing 199, for example, between the middle housing 180 and the lower housing 170.

Each sliding door module 171 may include an upper rail 172, a lower rail 173, and a treat compartment 174 (e.g., lower housing treat compartment 174) configured to hold food or treats for a pet or human. The upper rail 172 may be disposed along a top side of the sliding door module 171 and the lower rail 173 may be disposed along a bottom side of the sliding door module 171. The sliding door 122 may rest (e.g., abut, be disposed on) the upper rail 172 and the lower rail 173 when the sliding door 122 is coupled to the central housing 199.

Referring generally to FIGS. 1 and 5, the sliding door 122 may be coupled to the central housing 199 of the multilevel puzzle 100. In some examples, the sliding door 122 may be movably disposed between the lower housing 170 and the middle housing 180. For example, the sliding door 122 may be free to slide (i.e., slidable) between the lower housing 170 and the middle housing 180. Specifically, in some examples, the gate 123 of the sliding door 122 may be disposed on the upper rail 172 and lower rail 173 of the sliding door module 171. The gate 123 may be slidable along the upper rail 172 and the lower rail 173 when the sliding door 122 is coupled to the central housing 199 with the gate 123 of the sliding door 122 disposed between the lower housing 170 and the middle housing 180. In some examples, when the sliding door 122, specifically, the gate 123 is disposed between the lower housing 170 and the middle housing 180, the paddle 124 of the sliding door 122 may extend through a window 184 in the middle housing 180.

The sliding door 122 may be configured to slide or translate when a force (e.g., in a horizontal plane) is applied to the paddle 124 or gate 123. Specifically, the sliding door 122 may be configured to move from a starting position in which a treat compartment 174 disposed in a sliding door module 171 to which the sliding door 122 is coupled is concealed to a solved position in which the treat compartment 174 is revealed (e.g., visible) and accessible to a user (e.g., pet, human). Specifically, the sliding door 122 may be configured to slide (e.g., along a horizontal plane) from the starting position to the solved position. In some examples, the window 184 may control a range of motion (e.g., sliding) of the sliding door 122. For example, the paddle 124 may abut one side of the window 184 when the sliding door 122 is in a starting position and the paddle 124 may abut an opposite side of the window 184 when the sliding door is in the solved position. In other words, the paddle 124 is operable to slide or translate back and forth within the window 184 (i.e., side to side). In this way, the paddle 124, and thus the entire sliding door 122, is limited in the amount of translation by the size of the window 184.

In some examples, a treat wheel 112 disposed adjacent to the sliding door 122 may interact with the sliding door 122. Specifically, in some examples, when the treat wheel 112 is in starting position, the treat wheel 112 may prevent the sliding door 122 from being moved to the solved position. See FIGS. 1 and 2. Specifically, if a user (e.g., pet, human) tries to move the sliding door 122 from the starting position to the solved position when a treat wheel 112 proximate to the sliding door 122 is in the starting position, the treat wheel 112 may prevent the sliding door 122 from moving to the solved position. Specifically, as best seen in FIGS. 1-3, a sidewall 114 of the treat wheel 112 may block the sliding door 122 from traveling from the starting position to the solved position. In some examples, the upper overhang 125 of the sliding door 122 may contact the sidewall 114 of the treat wheel 112, preventing the sliding door 122 from being moved to the solved position. When a corresponding or adjacent treat wheel 112 is disposed in a solved position, the sliding door 122 may freely move past the treat wheel 112 to the solved position.

One or more locking features may be used to couple the middle housing 180 and the lower housing 170. Specifically, as illustrated in FIG. 10, the middle housing 180 may include one or more locking anchors 185 extending or protruding (e.g., downward) from the middle housing 180. In some examples, the one or more locking anchors 185 may be disposed radially around the middle housing 180. Further, as illustrated in FIG. 13, the lower housing 170 may include one or more recesses 176. The one or more recesses 176 may be disposed in an inner wall 175 of the lower housing 170. In some examples, the one or more recesses 176 may be disposed radially around the lower housing 170 (e.g., around the inner wall 175 of the lower housing 170). Each of the one or more recesses 176 may be configured to receive a locking anchor 185 of the middle housing 180, coupling the middle housing 180 and the lower housing 170. A corresponding number of locking anchors 185 and recesses 176 may be provided.

Figure 14:
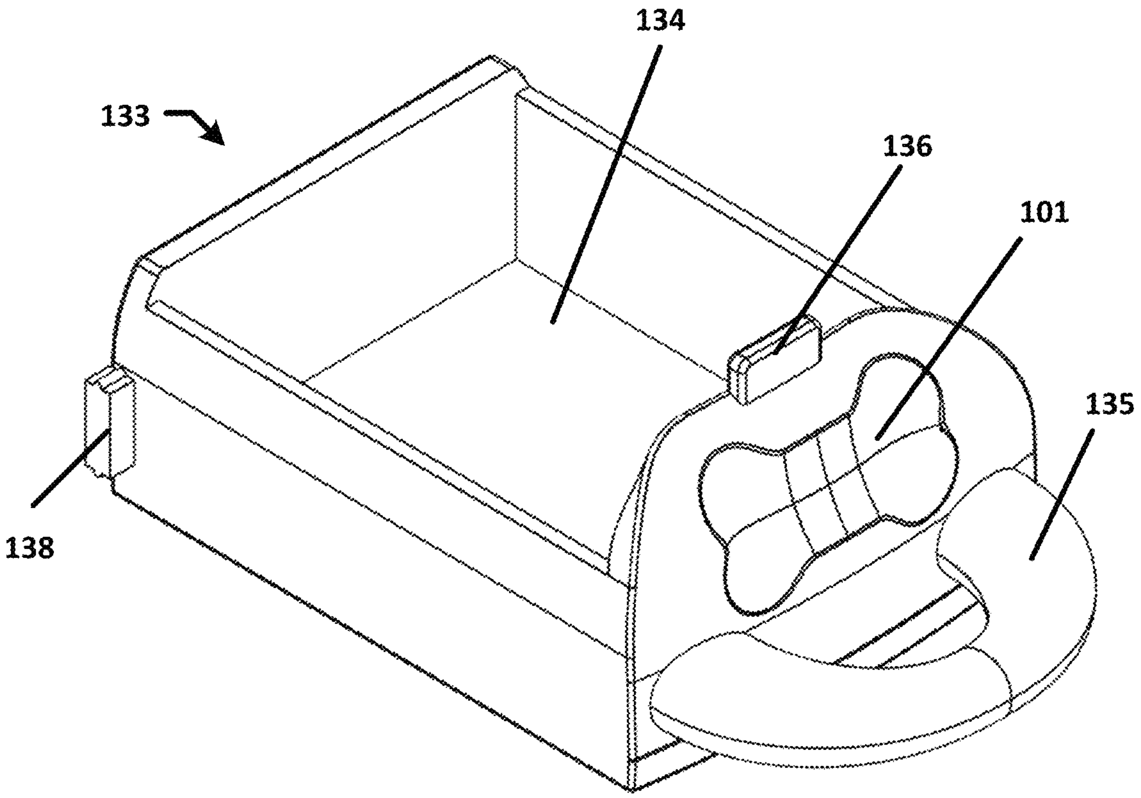
FIG. 14 illustrates a perspective view of a drawer in accordance with one example of the present disclosure.

Referring to FIG. 14, a drawer 133 in accordance with one example of the present disclosure is illustrated. As illustrated in FIG. 1, the multilevel puzzle 100 may include one or more drawers 133. As noted above, each of the drawers 133 may be movably coupled to the central housing 199. Specifically, each of the drawers 133 may be slidably coupled to the central structure 199 between the lower housing 170 and the base 160, so as to be selectively withdrawn from the central housing 199. As illustrated in FIG. 14, the drawer 133 may include a treat compartment 134, a handle 135, a tab 136, one or more stop blocks 138, and an image 101.

In some examples, as illustrated in FIG. 1, a corresponding number of drawers 133 and sliding doors 122 may be provided. In some examples, each drawer 133 may be disposed proximate to a corresponding sliding door 122, such that, the sliding door 122 and drawer 133 may interact with one another. Specifically, as described in greater detail below, in some positions (e.g., a starting position) a sliding door 122 disposed proximate to a drawer 133 may contact or abut the drawer 133, preventing the drawer 133 from being moved to a solved position. In some examples, each drawer 133 may be disposed below a corresponding sliding door 122.

The drawer 133 may include a treat compartment 134 (e.g., drawer treat compartment 134) configured to hold food or treats. The drawer 133 may be movable (e.g., slidable) between a starting position and a solved position. When the drawer 133 is in a starting or closed (e.g., inserted) position, the treat compartment 134 may be concealed or hidden within the central housing 199 of the puzzle 100. Each drawer 133 may be selectively withdrawn (e.g., slid) from the starting position to a solved position, in which the treat compartment 134 is accessible.

The drawer 133 may further include a handle 135. The handle 135 may extend or protrude outwardly from the drawer 133 so that a user (e.g., pet, human) may interact with the handle 135 to move the drawer 133 inward and outward from the central housing 199 (e.g., to push or pull the drawer 133). The drawer 133 may further include a tab 136. The tab 136 may extend or protrude from the drawer 133. Specifically, the tab 136 may extend upwardly from a front face of the drawer 133. The tab 136 may be configured to interact with a sliding door 122. Specifically, in some examples, the tab 136 may be configured to contact a lower overhang 126 of the sliding door 122, preventing the drawer 133 from being withdrawn from the central housing 199 when a corresponding sliding door 122 is in a starting position. In other words, when a corresponding sliding door 122 is in a starting position, the lower overhang 126 of the sliding door 122 extends or overhangs over the tab 136, such that the tab 136 is disposed between the lower overhang 126 of the sliding door 122 and the lower housing 170. If a user tried to pull on the handle 135 of the drawer 133, the tab 136 would contact the lower overhang 126 of the sliding door 122 and not be able to be pulled out. In some examples, the drawer 133 may further include one or more stop blocks 138. The one or more stop blocks 138 may extend or protrude from one or more sidewalls of the drawer 133 proximate to a back end of the drawer 133 and may prevent the drawer 133 from being completely removed from the central housing 199. In some examples, the drawer 133 may further include an image 101 of a treat, so as to alert or inform a user (e.g., pet, human) as to the treat compartment 134 disposed within the drawer 133, when the drawer 133 is in the starting position. In the example shown in FIG. 14, the image 101 is a bone, but other images may be used. In other examples, the drawer 133 may include an image 101 of a number, for example, indicating an order in which the multiple puzzles or levels of puzzles must be solved.

Figure 15:
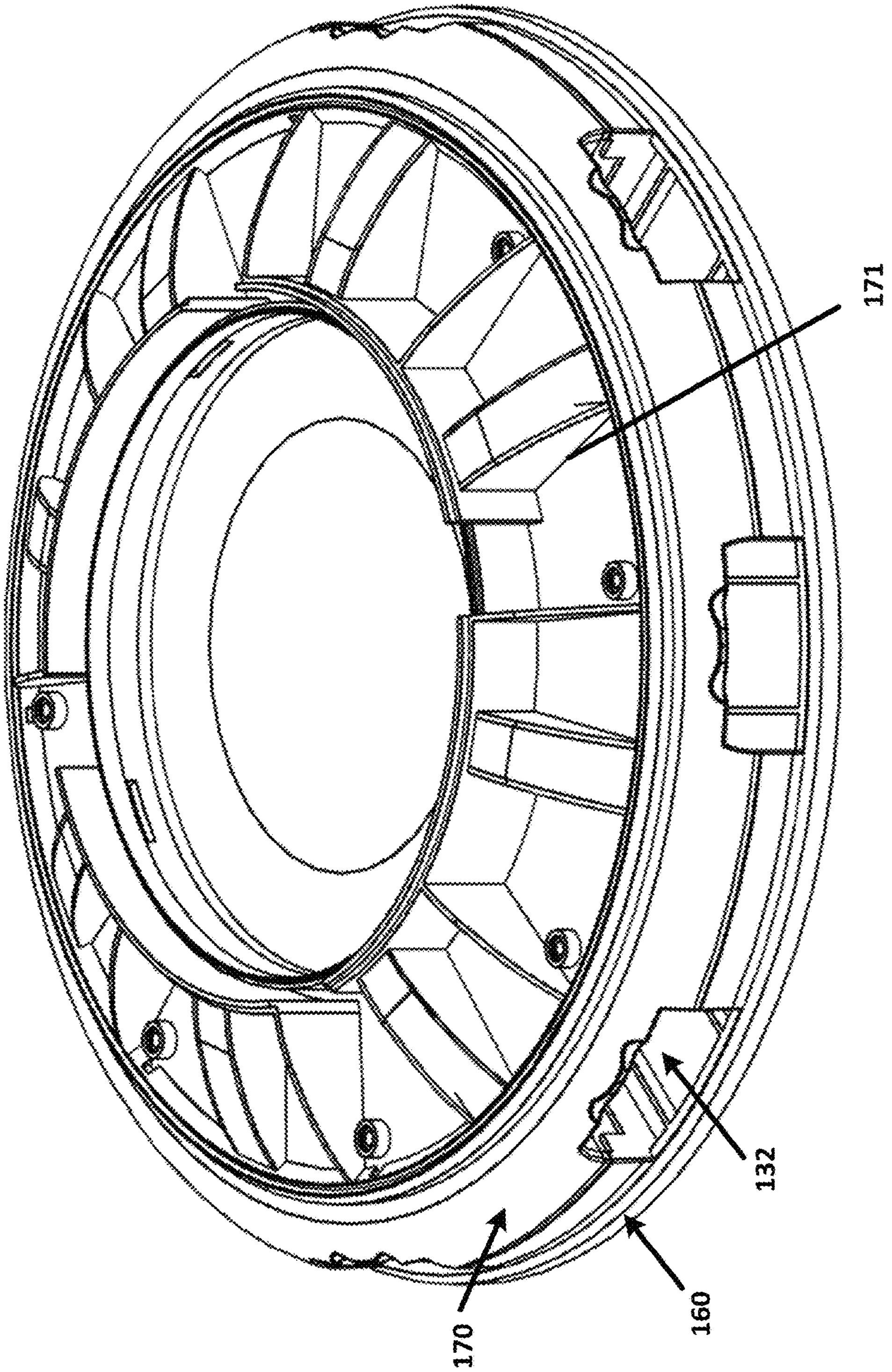
FIG. 15 illustrates a perspective view of a lower housing and base coupled to one another in accordance with one example of the present disclosure.

As noted above, the drawer 133 may be slidably disposed in the central structure 199 between the lower housing 170 and the base 160. Specifically, the drawer 133 may be slidably disposed within a cavity 132 disposed between the lower housing 170 and the base 160. Referring to FIG. 15, a lower housing 170 and a base 160 coupled to one another in accordance with one example of the present disclosure are illustrated. As shown in FIG. 15, the lower housing 170 and base 160 may collectively form the cavity 132. Specifically, in some examples, an upper passage 177 disposed in the lower housing 170 (see FIG. 13) and a lower passage 161 disposed in the base 160 (see FIG. 16) may collectively form the cavity 132.

Returning to FIG. 13, the lower housing 170 may include one or more upper passages 177. As described above, each of the upper passages 177 may form a portion of the cavity 132 in which a drawer 133 may be disposed when the drawer 133 is coupled to the central housing 199. Specifically, each upper passage 177 may form a top portion of the cavity 132. In some examples, as illustrated in FIG. 13, the one or more upper passages 177 may be disposed radially around the lower housing 170. In other examples, the upper passages 177 may be disposed along one or more sides of the lower housing 170.

In some examples, each upper passage 177 may be disposed proximate or adjacent to a corresponding sliding door module 171. Specifically, each upper passage 177 may be disposed adjacent to a sliding door module 171, such that a drawer 133 disposed in a cavity 132 formed by the upper passage 177 and a sliding door 122 coupled to the sliding door modules 171 may interact with one another. Specifically, as described below in greater detail, in some positions (e.g., a starting position) a sliding door 122 disposed proximate to a corresponding drawer 133 may contact or abut the drawer 133, preventing the drawer 133 from being moved to the solved position. Close proximity of the sliding door module 171 and upper passage 177 may allow interaction between the sliding door 122 and the drawer 133. In some examples, each upper passage 177 may be disposed below a corresponding sliding door module 171 such that a sliding door 122 coupled to the sliding door module 171 and a drawer 133 disposed in the cavity 132 may interact with one another.

Figure 16:
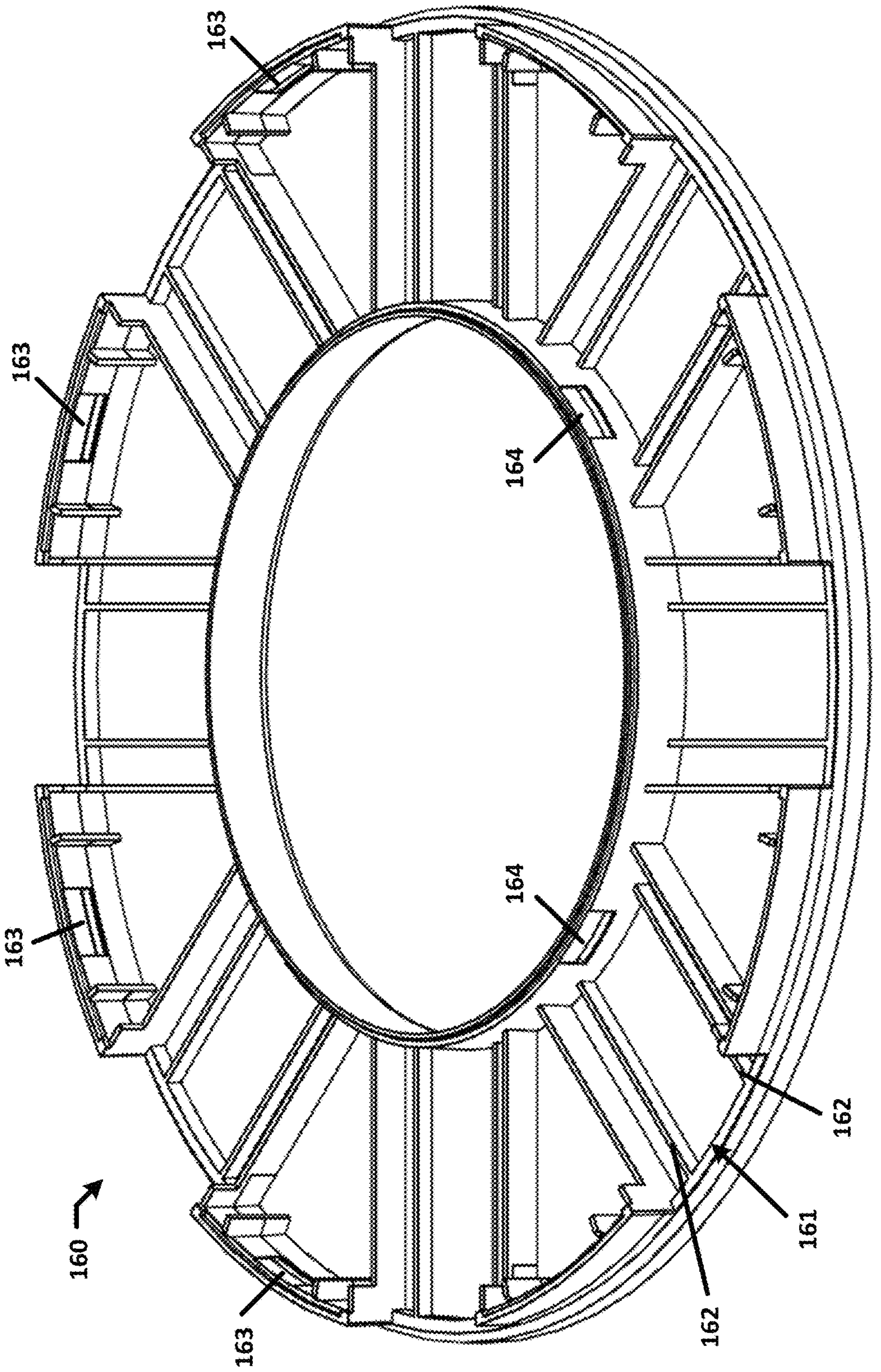
FIG. 16 illustrates a perspective view of a base in accordance with one example of the present disclosure.

Referring to FIGS. 15 and 16, a base 160 in accordance with one example of the present disclosure is illustrated. In some examples, as illustrated in FIGS. 15 and 16, the base 160 may have a substantially circular ring shape. In other examples, the base 160 may have another shape, such as, a rectangular, square, oval, polygon, or another shape. As illustrated in FIG. 15, the base 160 may include one or more lower passages 161. As described above, each of the lower passages 161 may form a portion (e.g., a bottom portion) of a cavity 132 in which a drawer 133 may be disposed. In some examples, as illustrated in FIG. 16, the one or more lower passages 161 may be disposed radially around the base 160. In other examples, the one or more lower passages 161 may be disposed along one or more sides of the base 160. A corresponding number of lower passages 161 and upper passages 177 may be provided. In some examples, each lower passage 161 may further include one or more rails 162 (e.g., base rails), as shown in FIG. 16. For example, the lower passage 161 may include a rail 162 along each side (e.g., left and right) of the lower passage 161. Each of the rails 162 may be configured to support a drawer 133 coupled to the central housing 199. In some examples, the lower passage 161 may include a single rail 162 disposed along a major axis of the lower passage 161.

Referring generally to the FIGS. 1-4, the drawer 133 may be coupled to the central housing 199 of the multilevel puzzle 100. In some examples, the drawer 133 may be movably disposed between the lower housing 170 and the base 160. Specifically, the drawer 133 may be movably disposed within a cavity 132 formed by the lower housing 170 and the base 160. For example, the drawer 133 may be free to slide or translate (i.e., slidable) between the lower housing 170 and the base 160. In some examples, the drawer 133 may be disposed on one or more rails 162 of the lower passage 161. The drawer 133 may be slidable along the one or more rails 162 of the lower passage 161 when the drawer 133 is disposed in the cavity 132 (i.e., between the lower housing 170 and the base 160).

The drawer 133 may be configured to slide when a force (e.g., in a horizontal plane) is applied to the drawer 133. Specifically, the drawer 133 may be configured to move from a starting position in which a treat compartment 134 is disposed, concealed, and/or hidden within the central housing 199 of the multilevel puzzle 100 to a solved position in which the treat compartment 134 is revealed (e.g., visible) and accessible to a user (e.g., pet, human). Specifically, the sliding door 122 may be configured to slide (e.g., along a horizontal plane) from a starting position in which the drawer 133 is inserted or disposed in the central housing 199 (e.g., the cavity 132) to a solved position in which the drawer 133 is withdrawn from the central housing 199 (e.g., the cavity 132).

In some examples, a sliding door 122 disposed adjacent to a drawer 133 may interact with the drawer 133. Specifically, in some examples, when the sliding door 122 is in starting position, the sliding door 122 may prevent the drawer 133 from being moved to the solved position. Specifically, if a user (e.g., pet, human) tries to move the drawer 133 from the starting position to the solved position when a sliding door 122 proximate to the drawer 133 is in the starting position, the sliding door 122 may prevent the drawer 133 from moving to the solved position. Specifically, a lower overhang 126 of the paddle 124 blocks the drawer 133 from traveling from the starting position to the solved position. In some examples, the lower overhang 126 may contact the tab 136 of the drawer 133 preventing the drawer 133 from being moved to the solved position. When a corresponding or adjacent sliding door 122 is in a solved position, the drawer 133 may freely move past the lower overhang 126 of the paddle 124 to the solved position.

Figure 17:
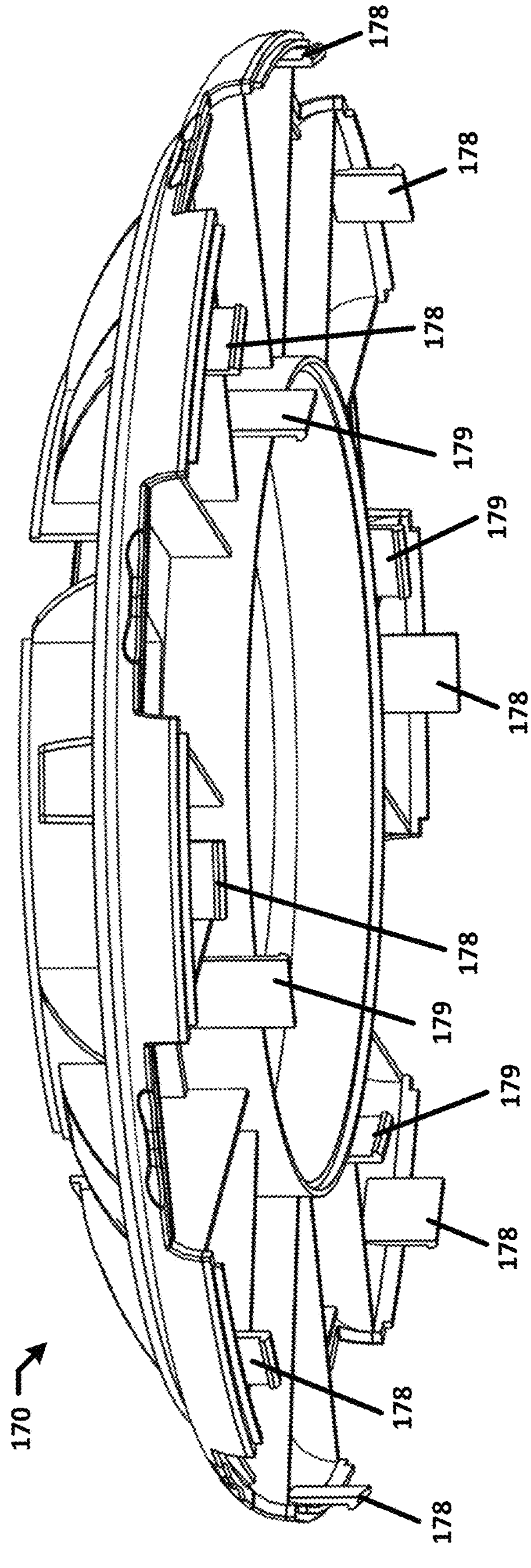
FIG. 17 illustrates a bottom perspective view of the lower housing in accordance with one example of the present disclosure.

One or more locking features may be used to couple the lower housing 170 and the base 160. Referring to FIG. 17, a bottom perspective view of a lower housing 170 in accordance with one example of the present disclosure is illustrated. Specifically, as illustrated in FIG. 17, the lower housing 170 may include one or more outer locking anchors 178 and/or one or more inner locking anchors 179 extending or protruding (e.g., downward) from the lower housing 170. The one or more outer locking anchors 178 may be disposed radially along an outer perimeter of the lower housing 170 and face an outer perimeter of the lower housing 170. The one or more inner locking anchors 179 may be disposed radially along the inner perimeter of the lower housing 170 and face an inner perimeter of the lower housing 170. Further, as illustrated in FIG. 16, the base 160 may include one or more outer recesses 163 and/or one or more inner recesses 164. The one or more outer recesses 163 and/or one or more inner recesses 164 may be disposed radially around the base 160. Each of the one or more outer recesses 163 may be configured to receive an outer locking anchor 178 of the lower housing 170, coupling the lower housing 170 and the base 160. A corresponding number of outer locking anchors 178 and outer recesses 163 may be provided. Each of the one or more inner recesses 164 may be configured to receive an inner locking anchor 179 of the lower housing 170, coupling the lower housing 170 and the base 160. A corresponding number of inner locking anchors 179 and inner recesses 164 may be provided.

Referring generally to FIGS. 1-3, a multilevel puzzle 100 in accordance with one example of the present disclosure is illustrated. In some examples, as illustrated in FIG. 1, the multilevel puzzle 100 may include four levels; however, the present disclosure is not limited thereto and may include any number of levels. For example, a multilevel puzzle 100 may also include one, two, three, or more than four levels. As illustrated in FIG. 1, the multilevel puzzle 100 includes a first level 110, a second level 120, a third level 130, and a fourth level 140. Each level 110, 120, 130, 140 may include a puzzle type to be solved. In some examples, as illustrated in FIG. 1, each level 110, 120, 130, 140 may include a different type of puzzle to be solved. For example, the first level 110 may include a first puzzle type 111 including a treat wheel 112, the second level 120 may include a second puzzle type 121 including a sliding door 122, the third level 130 may include a third puzzle type 131 including a drawer 133, and the fourth level 140 may include a fourth puzzle type 141 including a center wheel or revolving door 142. However, the present disclosure is not limited thereto and the different puzzle types 111, 121, 131, 141 may be disposed on different levels 110, 120, 130, 140. For example, a second puzzle type 121 may be disposed on a first level 110, third level 130, or a fourth level 140. In some examples, two or more levels 110, 120, 130, 140 may include the same puzzle type. For example, the first level 110 and the third level 130 may both include a first puzzle type 111.

Each level 110, 120, 130, 140 may include a single puzzle or two or more puzzles. For example, as illustrated in FIG. 1, each of the first level 110, second level 120, and third level 130 may include a plurality of the first puzzle type 111, second puzzle type 121, and third puzzle type 131, respectively, and the fourth level 140 may include a single puzzle having the fourth puzzle type 141. In some examples, each of the first level 110, second level 120, and third level 130 may include eight puzzles (e.g., of the respective puzzle type). In some examples, two or more levels 110, 120, 130, 140 may include the same number of puzzles. For example, as illustrated in FIG. 1, the first level 110, second level 120, and third level 130 may all include eight puzzles of the same puzzle type. The number of puzzles included may vary. For example, two or more levels 110, 120, 130, 140 may include two puzzles, three puzzles, four puzzles, or any other number of puzzles. In some examples, three or more levels 110, 120, 130, 140 may include the same number of puzzles. In some examples, each of the first level 110, second level 120, third level 130, and fourth level 140 may include a single puzzle (e.g., of the respective puzzle type).

The multilevel puzzle 100 may further include a plurality of treat compartments 195, 186, 174, 134. Each of the treat compartments 195, 186, 174, 134 may be configured to hold food or treats for pets or humans. Each of the treat compartments 195, 186, 174, 134 may be associated with or correspond to a puzzle, for example, a first puzzle type 111, a second puzzle type 121, a third puzzle type 131, or a fourth puzzle type 141. Referring generally to FIGS. 1-3, each of the first puzzle type 111, second puzzle type 121, third puzzle type 131, and fourth puzzle type 141 may include a portion (e.g., movable portion) configured to be moved from a starting position to a solved position. When the portion (e.g., movable portion) of each puzzle is in a starting position, a corresponding treat compartment may be concealed or covered. When the portion (e.g., movable portion) of each puzzle is in a solved position, the corresponding treat compartment may be accessible. The portion (e.g., movable portion) of each puzzle may be moved by a pet, for example, to solve the respective puzzle type 111, 121, 131, 141 or by a human to place a treat or food in the treat compartment.

A portion (e.g., the movable portion) of each of the puzzle types 111, 121, 131, 141 may be attached or coupled to the central housing 199 of the multilevel puzzle 100. Specifically, the treat wheel 112 of the first puzzle type 111, the sliding door 122 of the second puzzle type 121, the drawer 133 of the third puzzle type 131, and the revolving door 142 of the fourth puzzle type 141 may all be coupled to the central housing 199. Each of the treat wheel 112, sliding door 122, drawer 133, and revolving door 142 may be coupled to the central housing 199 of the multilevel puzzle 100 adjacent to a corresponding treat compartment, for example, 186, 174, 134, and 195, respectively. Each of the treat wheel 112, sliding door 122, drawer 133, and revolving door 142 may be configured to move from a starting position in which a corresponding treat compartment is concealed to a solved position in which the corresponding treat compartment is accessible. The movable portion, for example, the treat wheel 112, sliding door 122, drawer 133, and revolving door 142 may be configured to move relative to the corresponding treat compartment and/or the central housing 199 of the multilevel puzzle 100.

Referring generally to FIGS. 1 and 4, in some examples, the first level 110 may include a first puzzle type 111; however, the present disclosure is not limited thereto, and in some examples, the first level 110 may include the second puzzle type 121, the third puzzle type 131, or the fourth puzzle type 141. In some examples, the first level 110 may include a single puzzle. In other examples, the first level 110 may include a plurality of (e.g., two or more) puzzles. In some examples, the first level 110 may include eight puzzles having the first puzzle type (e.g., eight first puzzle types). In some examples, each of the puzzles included in the first level 110 may or may not be the same puzzle type. For example, the first level 110 may include a plurality of first puzzle types 111, a plurality of second puzzle types 121, a plurality of third puzzle types 131, or a plurality of fourth puzzle types 141. In some examples, the first level 110 may have a circular shape including a plurality of first puzzle types 111 disposed radially around the first level 110. For example, the first level 110 may include eight first puzzle types (e.g., disposed radially around the first level 110).

In one example of the present disclosure, as illustrated in FIGS. 1 and 4, the first level 110 may include a plurality of first puzzle types 111. Specifically, the first level 110 may include eight first puzzle types 111. As illustrated in FIG. 1, the first puzzle type 111 may include a treat compartment 186 (e.g., upper housing treat compartment, first level treat compartment, first treat compartment) disposed in the middle housing 180 and a treat wheel 112. The treat wheel 112 may comprise a movable portion of the first puzzle type 111 configured to selectively provide access to the treat compartment 186. Specifically, the treat wheel 112 may be movable between a starting position in which the treat compartment 186 included in the wheel bay 181 to which the treat wheel 112 is coupled is concealed (e.g., closed, hidden) and a solved position in which the treat compartment 186 is accessible. As described above, the treat wheel 112 may be rotatably coupled to the central housing 199, so as to rotate between the starting position and the solved position.

Referring generally to FIGS. 1 and 4, in some examples, the second level 120 may be disposed below the first level 110. In some examples, the second level 120 may include a second puzzle type 121; however, the present disclosure is not limited thereto, and in some examples, the second level 120 may include the first puzzle type 111, the third puzzle type 131, or the fourth puzzle type 141. In some examples, the second level 120 may include a single puzzle. In other examples, the second level 120 may include a plurality of (e.g., two or more) puzzles. In some examples, the second level 120 may have eight puzzles having the second puzzle type 121 (e.g., eight second puzzle types). In some examples, each puzzle included in the second level 120 may or may not be the same puzzle type. For example, the second level 120 may include a plurality of second puzzle types 121, a plurality of first puzzle types 111, a plurality of third puzzle types 131, or a plurality of fourth puzzle types 141. In some examples, the second level 120 may have a circular shape including a plurality of second puzzle types 121 disposed radially around the second level 120. For example, the second level 120 may include eight second puzzle types disposed radially around the second level 120.

In one example of the present disclosure, as illustrated in FIGS. 1 and 4, the second level 120 may include a plurality of second puzzle types 121. Each of the second puzzle types 121 may include a treat compartment 174 (e.g., middle housing treat compartment, second level treat compartment, second treat compartment) and a sliding door 122. The sliding door 122 may comprise a movable portion of the second puzzle type 121 configured to selectively provide access to the treat compartment 174. Specifically, the sliding door 122 may be movable between a starting position in which a treat compartment 174 included in a sliding door module 171 to which the sliding door 122 is coupled is concealed (e.g., closed, hidden) and a solved position in which the treat compartment 174 is accessible. As described above, the sliding door 122 may be slidably coupled to the central housing 199 so as to slide between the starting position and the solved position.

In some examples, a puzzle (e.g., second puzzle type 121) disposed on the second level 120 may be disposed below a puzzle (e.g., first puzzle type 111) disposed on the first level 110. Specifically, a second puzzle type 121 may be disposed on the second level 120 so as to interact with a first puzzle type 111 disposed on the first level 110 above the second puzzle type 121. For example, as described above, a treat wheel 112 disposed on the first level 110 may interact with the sliding door 122 disposed on the second level 120. In some examples, a treat wheel 112 disposed on the first level 110 may selectively prevent a sliding door 122 on an adjacent level (e.g., the second level 120) from being moved from the starting position to the solved position. For example, when the treat wheel 112 is in a starting position (e.g., in which the top surface is substantially horizontal) the treat wheel 112 may block the sliding door 122, preventing the sliding door 122 from moving from the starting position to the solved position. Specifically, if a user (e.g., pet, human) attempts to slide the sliding door 122 from the starting position to the solved position when a treat wheel 112 disposed above the sliding door 122 is in the starting position, the paddle 124 of the sliding door 122 may abut or contact the sidewall 114 of the treat wheel 112, preventing the sliding door 122 from being moved to the solved position.

As described above, in some examples, the paddle 124 may include an upper overhang 125 configured to abut the sidewall 114 of the treat wheel 112, preventing the sliding door 122 from moving from the starting position to the solved position when the treat wheel 112 is in the starting position. However, when the treat wheel 112 is in the solved position (e.g., in which the top surface 113 of the treat wheel 112 is vertical), the sliding door 122 may freely move from the starting position to the solved position.

In some examples, a moveable portion of the first puzzle type 111, specifically, the treat wheel 112, may be configured to move in a different direction than a moveable portion of the second puzzle type 121, specifically, the sliding door 122. For example, the treat wheel 112 may be configured to rotate (e.g., about a horizontal axis) such that the outer half 116 and inner half 117 move vertically and the sliding door 122 may be configured to slide horizontally. Accordingly, the treat wheel 112 may be configured to move in a first direction or along a first axis (e.g., upward or downward while rotating) and the sliding doors 122 may be configured to move in a second direction or along a second axis (e.g., left or right). Accordingly, the sliding door 122 may move in a second direction parallel to axis of rotation of the treat wheel 112 and thus perpendicular to the first direction of movement of the treat wheel 112.

Referring generally to FIGS. 1 and 4, in some examples, the third level 130 may be disposed below the second level 120. In some examples, the third level 130 may include a third puzzle type 131; however, the present disclosure is not limited thereto, and in some examples, the third level 130 may include the first puzzle type 111, the second puzzle type 121, or the fourth puzzle type 141. In some examples, the third level 130 may include a single puzzle. In other examples, the third level 130 may include a plurality (e.g., two or more) puzzles. In some examples, the third level 130 may include eight puzzles having the third puzzle type 131 (e.g., eight third puzzle types). In some examples, each puzzle included in the third level 130 may or may not be the same puzzle type. For example, the third level 130 may include a plurality of first puzzle types 111, a plurality of second puzzle types 121, a plurality of third puzzle types 131, or a plurality of fourth puzzle types 141. In some examples, the third level 130 may have a circular shape including a plurality of third puzzle types 131 disposed radially around the third level 130. For example, the third level 130 may include eight third puzzle types 131 disposed radially around the third level 130.

In one example of the present disclosure, as illustrated in FIGS. 1 and 4, the third level 130 may include a plurality of third puzzle types 131. Specifically, the third level 130 may include eight third puzzle types 131. Each of the third puzzle types 131 may include a cavity 132 disposed in the central housing 199 and a drawer 133. In some examples, as described above, the lower housing 170 and the base 160 may collectively form the cavity 132. The drawer 133 may include a treat compartment 134 (e.g., drawer treat compartment, third level treat compartment, third treat compartment). The drawer 133 may comprise a movable portion of the third puzzle type 131 and may be configured to be selectively removed or withdrawn from the cavity 132 so as to make the treat compartment 134 accessible. Specifically, the drawer 133 may be movable between a starting position in which the treat compartment 134 is concealed (e.g., closed, hidden) and a solved position in which the treat compartment 134 is accessible. As described above, the drawer 133 may be slidably coupled to the central housing 199, so as to slide or be withdrawn from cavity 132.

In some examples, a puzzle (e.g., third puzzle type 131) disposed on a third level 130 may be disposed below a puzzle (e.g., second puzzle type 121) disposed on the second level 120. Specifically, a third puzzle type 131 may be disposed on the third level 130 so as to interact with a second puzzle type 121 disposed on the second level 120 above the third puzzle type 131. For example, as described above the sliding door 122 disposed on the second level 120 may interact with the drawer 133 disposed on the third level 130. In some examples, a sliding door 122 disposed on the second level 120 may selectively prevent a drawer 133 on an adjacent level (e.g., third level 130) from being moved from a starting position to the solved position. For example, when the sliding door 122 is in the starting position, the lower overhang 126 may block the drawer 133, preventing the drawer 133 from moving from the starting position to the solved position. Specifically, if a user (e.g., pet, human) attempts to slide or withdraw the drawer 133 from a starting position to a solved position when the sliding door 122 disposed above the drawer 133 is in a starting position, the lower overhang 126 of the paddle 124 may abut or contact the tab 136 of the drawer 133, preventing the drawer 133 from being moved to the solved position. However, when the sliding door 122 is in the solved position, the drawer 133 may freely move from the starting position to the solved position.

In some examples, a movable portion of the third puzzle type 131, specifically the drawer 133, may be configured to move in a different direction than the movable portion of the second puzzle type 121, specifically, the sliding door 122. In other words, the sliding door 122 may be configured to move along a horizontal axis radially around the multilevel puzzle 100 and the drawer 133 may be configured to be move radially inward and/or or outward (e.g., along a single radius). Accordingly, the sliding door 122 may be configured to move in the second direction along a second axis (e.g., in the horizontal plane) and the drawer 133 may be configured to move in a third direction along a third axis (i.e., toward or away from a center of the multilevel puzzle 100). Accordingly, the sliding door 122 may be configured to move in a second direction radially around the multilevel puzzle 100 and the drawer 133 may be configured to move in a third direction, perpendicular to the second direction and toward or away from a center of the multilevel puzzle 100 along a single radius of the multilevel puzzle 100.

Referring generally to FIGS. 1 and 4, in some examples, the fourth level 140 may be disposed above the first level 110 of the multilevel puzzle 100. For example, the fourth level 140 may be a top level of the multilevel puzzle 100. In some examples, the fourth level 140 may include a fourth puzzle type 141; however, the present disclosure is not limited thereto, and, in some examples, the fourth level 140 may include the first puzzle type 111, the second puzzle type 121, or the third puzzle type 131. In some examples, as illustrated in FIG. 1, the fourth level 140 may include a single puzzle. In other examples, the fourth level 140 may include a plurality (e.g., two or more) puzzles. In some examples, the fourth level 140 may include a single puzzle having the fourth puzzle type 141. In some examples, as illustrated in FIG. 1, the fourth level 140 may have a circular shape.

In one example of the present disclosure, as illustrated in FIGS. 1 and 4, the fourth level 140 may include a single fourth puzzle type 141. Specifically, the fourth puzzle type 141 may include one or more treat compartments 195 (e.g., upper housing treat compartment, fourth level treat compartment, fourth treat compartment) disposed in the upper housing 190, and a revolving door 142. The revolving door 142 may include a movable portion of the fourth puzzle type 141 and may be rotated to selectively provide access to the one or more treat compartments 195 disposed in the upper housing 190. Specifically, the revolving door 142 may be rotated from a starting position in which a treat compartment 195 disposed in the upper housing 190 is covered or concealed by the face 143 of the revolving door 142 to a solved position in which the opening 145 of the revolving door 142 is aligned with the treat compartment 195, such that the treat compartment 195 is revealed (e.g., visible) and accessible through the opening 145. As described above, the revolving door 142 may be rotatably coupled to the central housing 199.

In some examples, the multilevel puzzle 100 may include a corresponding number of treat wheels 112, sliding doors 122, and drawers 133. Specifically, the treat wheels 112, sliding doors 122, and drawers 133 may be provided in sets with each set including a treat wheel 112, a sliding door 122, and a drawer 133. In some examples, as described above, in each set of puzzles the treat wheel 112 (e.g., movable portion of the first level puzzle, movable portion of the first puzzle type) must be moved from the starting position to the solved position before the sliding door 122 (e.g., movable portion of the second level puzzle, movable portion of the second puzzle type) may be moved from the starting position to the solved position. Similarly, in each set of puzzles, the sliding door 122 (e.g., movable portion of the second level puzzle, movable portion of the second puzzle type) must be moved from the starting position to the solved position before the drawer 133 (e.g., movable portion of the third level puzzle, movable portion of the third puzzle type) may be moved from the starting position to the solved position. As described above, puzzles requiring a vertical movement (e.g., puzzles including a treat wheel 112) and puzzles requiring a horizontal movement (e.g., puzzles including a sliding door 122) may be disposed on alternating levels of the multilevel puzzle 100. Similarly, as described above, puzzles requiring perpendicular horizontal movements (e.g., puzzles including the sliding door 122 and puzzles including the drawer 133) may be disposed on alternating levels of the multilevel puzzle 100.

Figure 18:
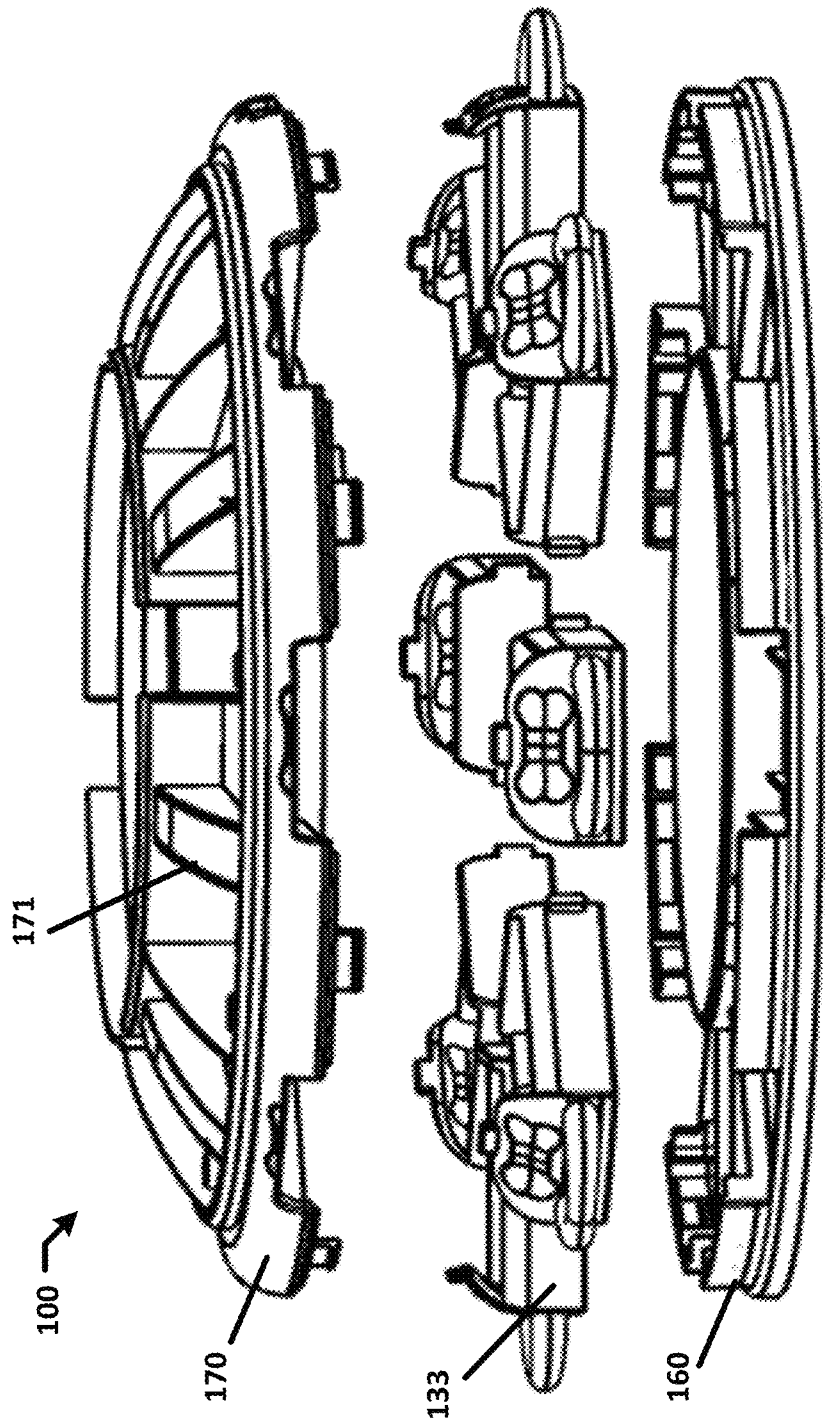
FIG. 18 illustrates an exploded view of a base, a plurality of drawers, and a lower housing in accordance with one example of the present disclosure.
Figure 19:
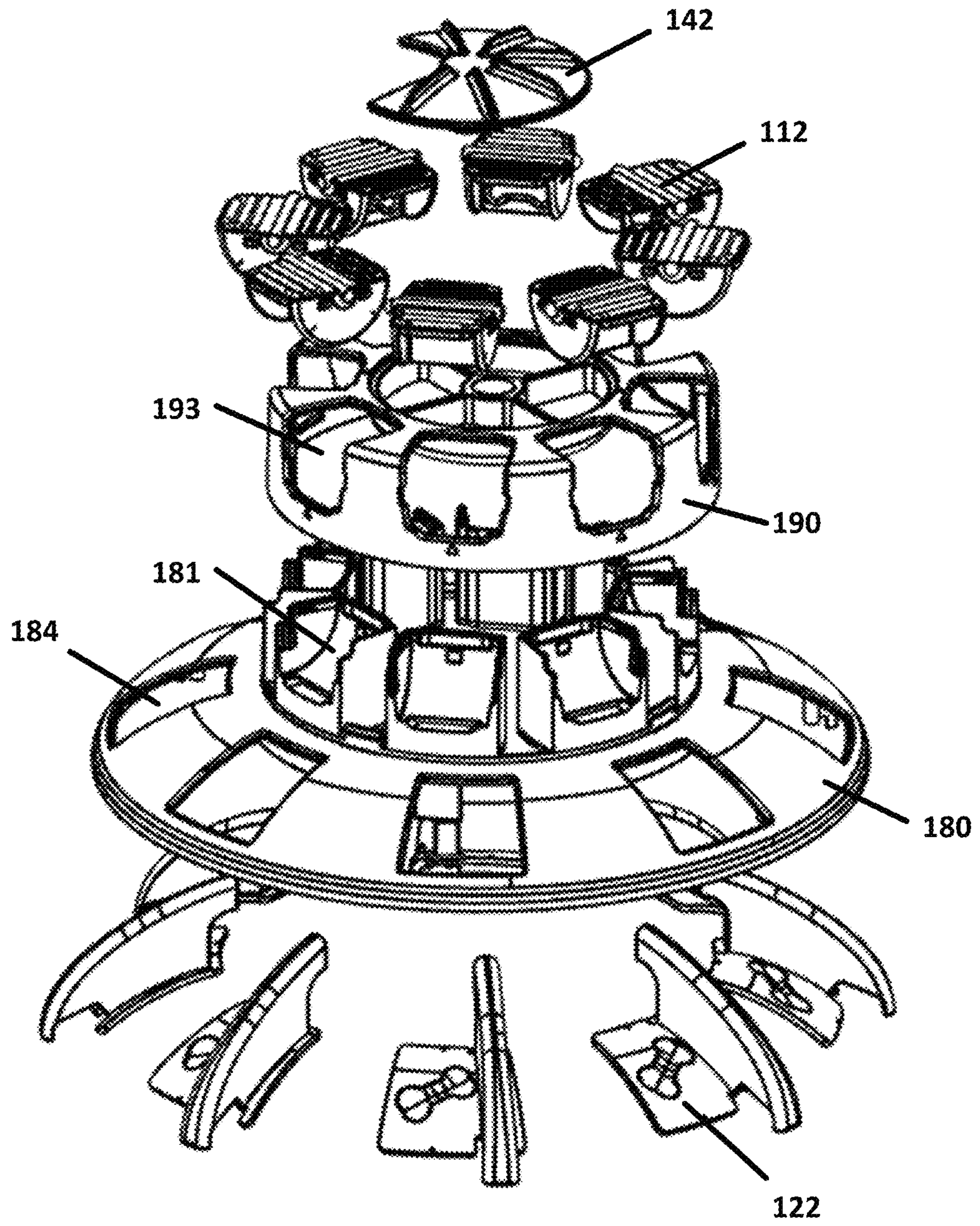
FIG. 19 illustrates a partial exploded view of a multilevel puzzle in accordance with one example of the present disclosure.
Figure 20:
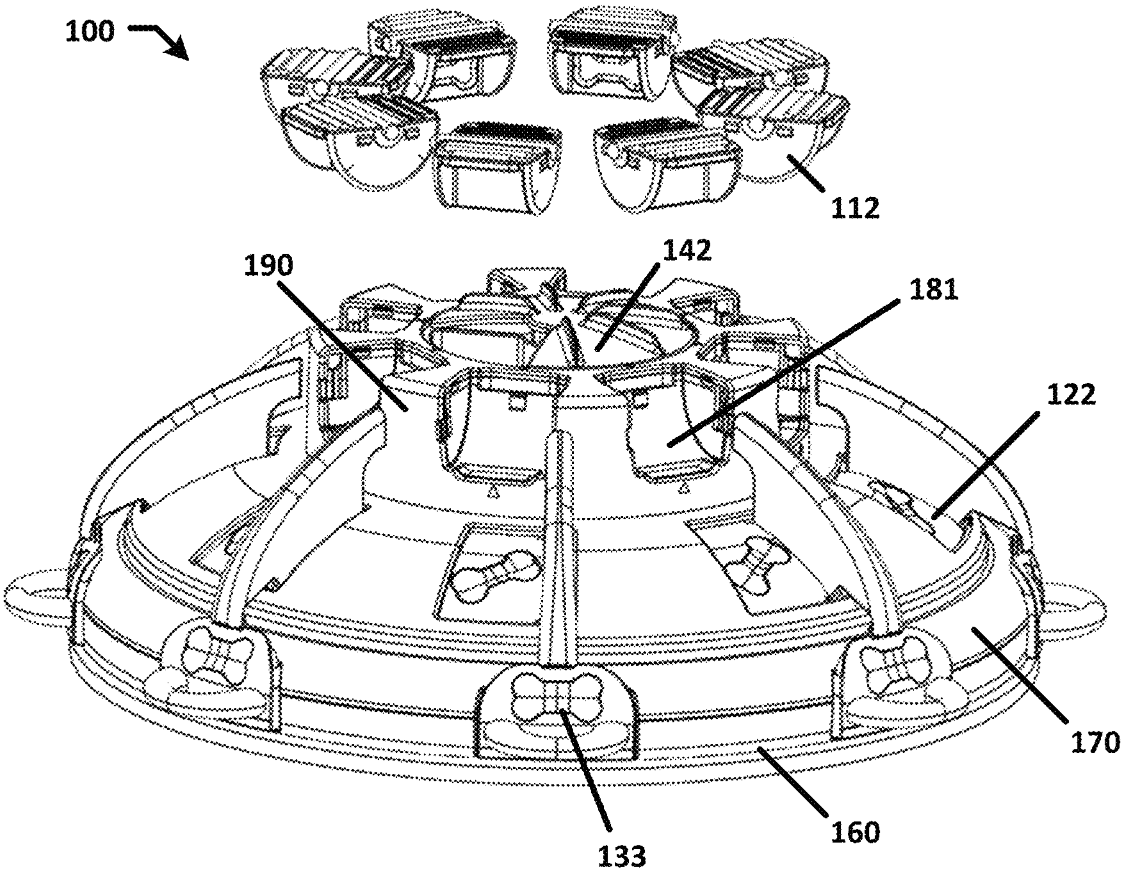
FIG. 20 illustrates a multilevel puzzle including a plurality of isolated treat wheels in accordance with one example of the present disclosure.
Figure 21:
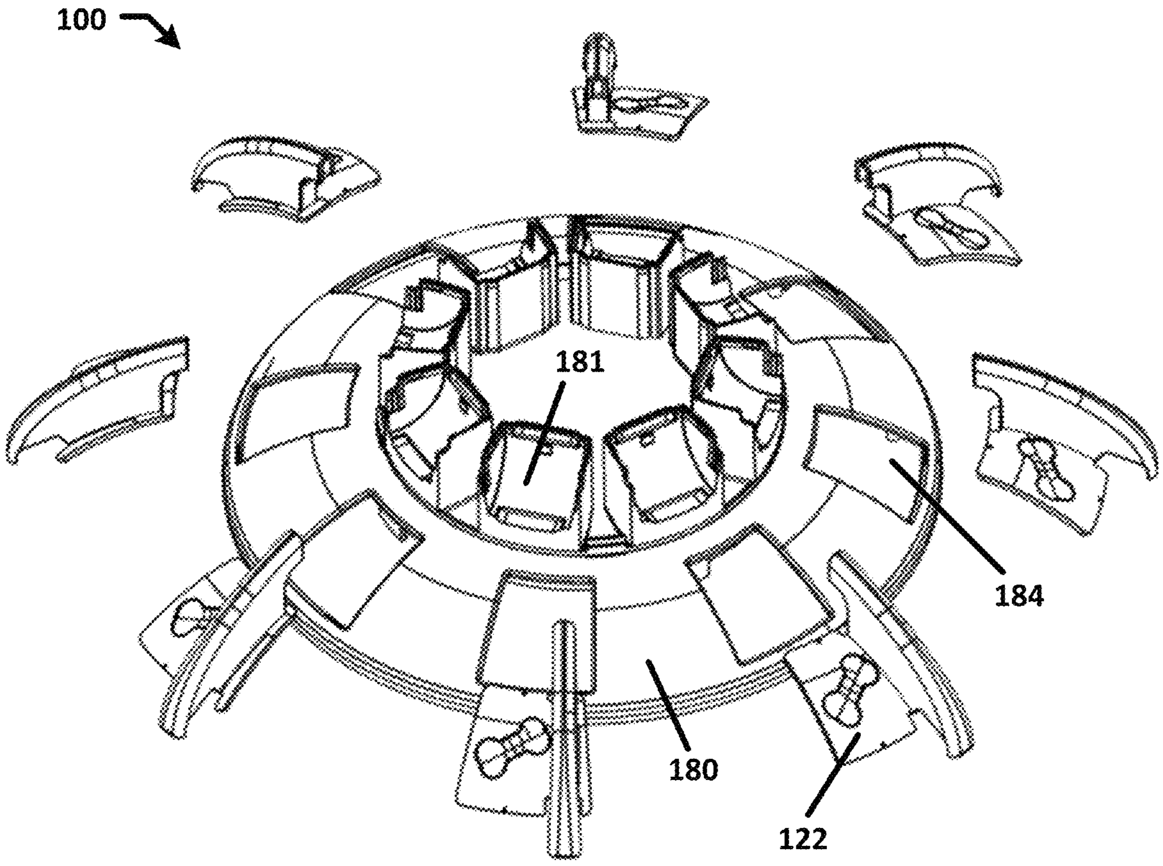
FIG. 21 illustrates a plurality of sliding doors and a middle housing in accordance with one example of the present disclosure.

Referring generally to FIGS. 18-21, additional views of the multilevel puzzle 100 or components of multilevel puzzle 100 are illustrated in accordance with examples of the present disclosure. Specifically, FIG. 18 illustrates an exploded view of a base 160, a plurality of drawers 133, and a lower housing 170 in accordance with one example of the present disclosure. Further, FIG. 19 illustrates a partial exploded view of a multilevel puzzle 100 in accordance with an example of the present disclosure. FIG. 20 illustrates a multilevel puzzle 100 including a plurality of isolated treat wheels 112 in accordance with one example of the present disclosure. Finally, FIG. 21 illustrates a plurality of sliding doors 122 and a middle housing 180 in accordance with one examples of the present disclosure.

While the present disclosure has been described with reference to specific examples, which are intended to be illustrative only and not to be limiting of the disclosure, it should be apparent to those of ordinary skill in the art that changes, additions and/or deletions may be made to the disclosed embodiments without departing from the spirit and scope of the disclosure.

The foregoing description is given for clarity of understanding only, and no unnecessary limitations should be understood therefrom, as modifications within the scope of the disclosure may be apparent to those having ordinary skill in the art.

When a component, device, element, or the like of the present disclosure is described as having a purpose or performing an operation, function, or the like, the component, device, or element, should be considered herein as being "configured to" meet that purpose or perform that operation or function.

What is claimed is:

1. A multilevel pet puzzle, the pet puzzle comprising:
a first level including a first puzzle of a first puzzle type, a portion of the first puzzle rotatable about a substantially horizontal axis from a starting position to a solved position to provide access to a first treat compartment; and
a second level including a second puzzle of a second puzzle type, a portion of the second puzzle movable from a starting position to a solved position to provide access to a second treat compartment,
wherein when the portion of the first puzzle is in the starting position, the portion of the first puzzle prevents the portion of the second puzzle from being moved to the solved position, and
wherein the portion of the second puzzle is slidable from the starting position to the solved position.

2. The pet puzzle of claim 1, further comprising:
a third level including a third puzzle of a third puzzle type, a portion of the third puzzle movable to provide access to a third treat compartment.

3. The pet puzzle of claim 2, wherein:
the portion of the third puzzle is movable from a starting position to a solved position; and
when the portion of the second puzzle is in the starting position, the portion of the second puzzle prevents the portion of the third puzzle from being moved to the solved position.

4. The pet puzzle of claim 2, further comprising:
a fourth level including a fourth puzzle of a fourth puzzle type, a portion of the fourth puzzle movable to provide access to a fourth treat compartment.

5. The pet puzzle of claim 1, wherein:
the portion of the first puzzle is movable in a first direction from a starting position to a solved position; and
the portion of the second puzzle is movable in a second direction, different than the first direction, from a starting position to a solved position.

6. The pet puzzle of claim 5, wherein the first direction and the second direction are perpendicular.

7. The pet puzzle of claim 1, wherein:
the first level includes a plurality of puzzles of the first puzzle type; and
the second level includes a plurality of puzzles of the second puzzle type.

8. The pet puzzle of claim 1, wherein:
the portion of the first puzzle includes a treat wheel; and
the portion of the second puzzle includes a sliding door.

9. The pet puzzle of claim 1, wherein the first level is disposed above the second level.

10. A multilevel pet puzzle, the pet puzzle comprising:
a housing;
a first level including a first level treat compartment and a treat wheel, the treat wheel rotatably coupled to the housing and rotatable about a substantially horizontal axis between a starting position in which the first level treat compartment is concealed and a solved position in which the first level treat compartment is accessible; and a second level disposed below the first level, the second level including a second level treat compartment and a sliding door, the sliding door slidably coupled to the housing such that the sliding door is slidable between a starting position in which the second level treat compartment is concealed and a solved position in which the second level treat compartment is accessible, wherein when the treat wheel is in the starting position, the treat wheel prevents the sliding door from being moved to the solved position.

11. The pet puzzle of claim 10, wherein:

the treat wheel is rotatable in a first direction from the starting position to the solved position;

the sliding door is slidable in a second direction from the starting position to the solved position; and the first direction and the second direction are perpendicular.

12. The pet puzzle of claim 10, wherein:

the first level includes a plurality of first level treat compartments and a plurality of treat wheels rotatably coupled to the housing, each of the plurality of treat wheels rotatable between a starting position in which a corresponding first level treat compartment is concealed and a solved position in which the corresponding first level treat compartment is accessible; and the second level includes a plurality of second level treat compartments and a plurality of sliding doors slidably coupled to the housing, each of the plurality of sliding doors slidable between a starting position in which a corresponding second level treat compartment is concealed and a solved position in which the corresponding second level treat compartment is accessible.

* * * * *